Jan. 16, 1968  B. D. DOBBINS ET AL  3,363,858
DOPPLER HOMING SYSTEM
Filed Sept. 23, 1958  13 Sheets-Sheet 1

BILLY D. DOBBINS
OSCAR M. MARTIN, JR.
HOWELL B. MUNSON, JR.
HILARY N. NALL
    INVENTORS

BY
    ATTORNEYS

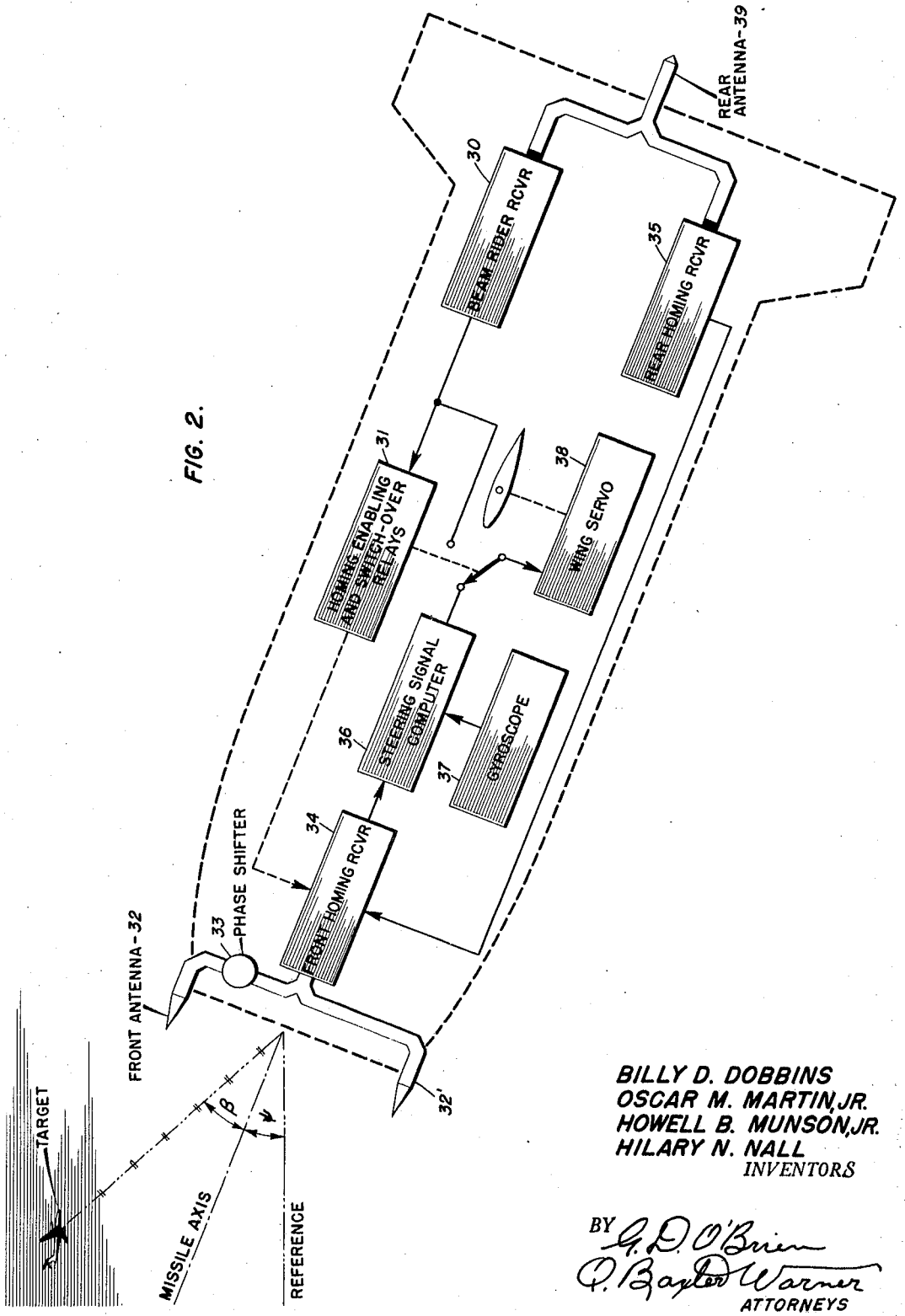

Jan. 16, 1968  B. D. DOBBINS ET AL  3,363,858
DOPPLER HOMING SYSTEM
Filed Sept. 23, 1958  13 Sheets-Sheet 4

REAR I.F. AMPLIFIER

BILLY D. DOBBINS
OSCAR M. MARTIN, JR.
HOWELL B. MUNSON, JR.
HILARY N. NALL
INVENTORS

BY *G. D. O'Brien*
*Q. Baxter Warner*
ATTORNEYS

FRONT END FIRST I.F. AMPLIFIER

BILLY D. DOBBINS
OSCAR M. MARTIN
HOWELL B. MUNSON, JR.
HILARY N. NALL
INVENTORS

BY
ATTORNEYS

CRYSTAL OSCILLATOR

BILLY D. DOBBINS
OSCAR M. MARTIN, JR.
HOWELL B. MUNSON, JR.
HILARY N. NALL
INVENTORS

TARGET SWEEP

BILLY D. DOBBINS
OSCAR M. MARTIN, JR.
HOWELL B. MUNSON, JR.
HILARY N. NALL
INVENTORS

United States Patent Office 3,363,858
Patented Jan. 16, 1968

3,363,858
DOPPLER HOMING SYSTEM
Billy D. Dobbins, Silver Spring, Oscar M. Martin, Jr., Bethesda, Howell Brook Munson, Jr., Laurel, and Hilary H. Nall, West Hyattsville, Md., assignors to The United States of America as represented by the Secretary of the Navy
Filed Sept. 23, 1958, Ser. No. 762,898
20 Claims. (Cl. 244—3.14)

The present invention relates to a guidance system for an aerial vehicle. More particularly, it relates to guidance apparatus enabling a missile to home on moving targets without interference by signals from stationary objects.

Prior to the present invention, a missile homing system had been devised which was based upon a radio interferometer. The interferometer homing system as originally conceived and as subsequently improved, is disclosed in the following United States patents and pending patent applications:

U.S. Patent Application S.N. 111,313, now Patent No. 3,328,794, filed Aug. 19, 1949, by O. J. Baltzer for "Radar System for Determining the Relative Direction of Two Objects Moving in Space," U.S. Patent 2,701,875 "Resistance Type of Phase Shifter," by O. J. Baltzer, U.S. Patent Application S.N. 319,624, filed Nov. 10, 1952, by C. W. Brown et al., for "Homing Guidance System," U.S. Patent Application S.N. 594,067, filed June 26, 1956, by W. A. Goss et al., for "Guided Missile," U.S. Patent Application S.N. 603,460, now Patent No. 3,181,813, filed Aug. 10, 1956, by J. F. Gulick et al., for "Homing System."

The present invention relies in great part upon a combination of elements disclosed in varying detail in the above cited patent applications. It is directed primarily towards improving the performance of the interferometer homing device in tactical situations which would have completely frustrated the operation of the prior system. In illustration let it first be assumed that an interferometer equipped missile capable of satisfactory operation against a single target is available. When applied against a pair of targets or against a multiple target formation, it can be perceived that a certain deployment of targets will deceive the missile as to the correct course for destroying any single target and as a result the lot will escape completely. To guard against such an event, range gate circuits have been provided which pass signals from the target nearest the missile and reject signals from more distant targets. Thus some measure of discrimination against confusing multiple targets is afforded.

It shortly became apparent that an adept missile guidance system must avoid confusion not only by multiple targets but also by various clutter signals which are beyond the ability of the range gate to resolve. For instance, a shipborne missile system could not be considered truly effective unless it was capable of defending against low altitude attack. At low altitude, however, a virtual image of the target will appear beneath the surface of the sea together with large amounts of sea clutter. In land based systems, targets are likely to be concealed by terrestrial reflectors such as might be formed by buildings, engineering structures or topographical features.

Therefore proposals were advanced to replace the range gate of the prior homing system with a speed gate which would select only those signals emanating from a moving target. The distinction between targets moving at appreciable velocities and stationary reflectors, theoretically at least, is readily made on the basis of the Doppler frequency differences present in the signals received. It then became appropriate to assess the advantages of continuous wave (CW) radar transmission as compared to pulse radar transmission. While several advantages appear on the side of pulse radars, the most pronounced disadvantage appeared to be the possible existence of serious range and velocity ambiguities. On the other hand, CW radars are free from velocity ambiguities and, therefore, the CW radar was endorsed as being more nearly capable of providing a guidance system of adequate dexterity. The CW radar is not without disadvantages, however. Outstanding is the fact that CW radar greatly multiplies the problem of the contamination of signals by spillover energy, a problem to be treated in greater detail hereinafter.

While not all of the objects of the present invention will be appreciated prior to a full understanding thereof, it will be recognized that the invention has as its principal object the provision of a guided missile homing system capable of functioning in cooperation with a CW radar.

A further object of the invention is to provide a missile homing system which is capable of distinguishing a target moving at a particular velocity from targets moving at other velocities or from stationary objects.

Another object of the invention is to provide, in cooperation with a CW radar, an interferometer-type missile homing system capable of operating in the presence of spillover energy levels heretofore considered prohibitively high.

Still another object of the invention is to provide a guided missile capable of homing on a target signal of many times less power than the power of clutter signals radiated by stationary objects.

An additional object of the invention is to provide a homing system capable of selecting, by remotely controlled means, a particular target signal from amongst a plurality of target signals and clutter from stationary objects.

Another object of the invention is to provide a missile homing system further characterized by absence of internally generated noise, by circuits suitable for the operation of transistors and by the absence of circuit components which are difficult to manufacture.

Other objects and many of the attendant advantages of this invention will be readily appreciated as the same becomes better understood by reference to the following detailed description when considered in connection with the accompanying drawings, wherein:

FIG. 2 is a block diagram broadly disclosing the airborne guidance components of a missile;

Figure 1:
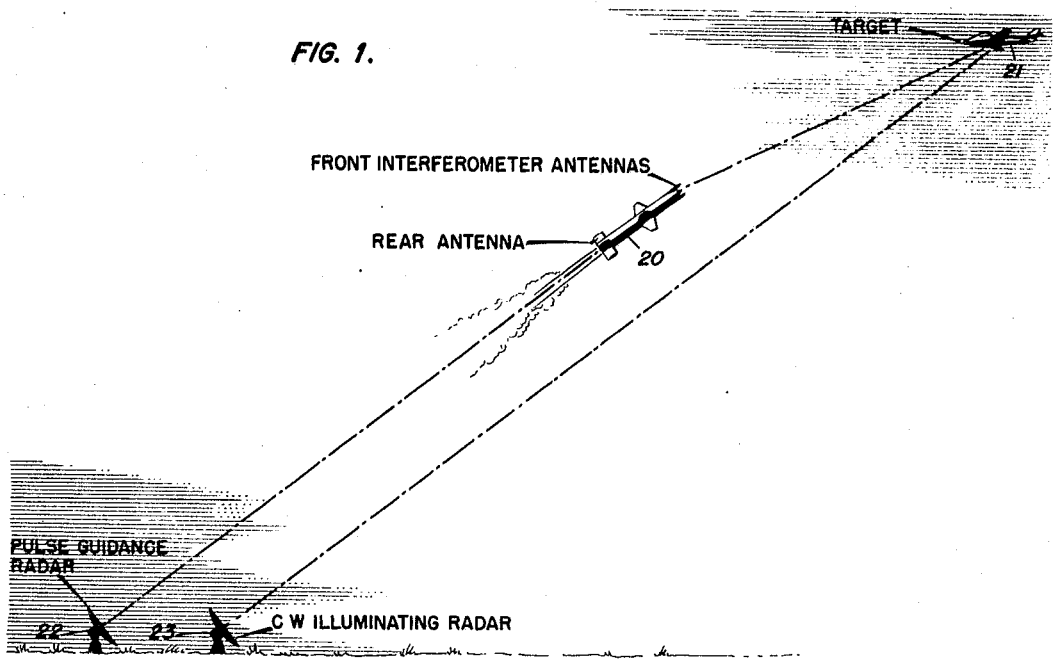
FIG. 1 is a pictorial representation of a guided missile operating against a target.

In FIG. 1, a missile 20 is seen in flight towards a target 21. During the initial and mid-course portions of the flight toward the target 21, guidance is accomplished by the beam rider method wherein the missile centers itself in a radio beam radiated by a pulse guidance radar 22. The guidance radar 22 may be programmed to steer the missile along a more efficient trajectory than along a direct line of sight toward the target and thus the missile might gain the advantages of lower drag flight and a more favorable position upon the commencement of homing guidance. During beam rider guidance, the target 21 is followed by a tracking radar 23 radiating a beam of continuous radio energy. Energy from the tracking beam is reflected by the target, and is utilized by the missile to develop homing signals which indicate the relative bearing of the source of reflections.

The missile is provided with two pairs of antennas at its forward end, each pair of which are combined as interferometers to provide steering signals for correcting errors in the pitch and yaw planes of missile motion. A single antenna at the rear of the missile receives radiation directly from the tracking radar 23 so that the Doppler frequencies of the signals from the front antennas may be accurately established.

The location of the target signal in the frequency spectrum depends upon the relative velocities of the missile and target referred to the tracking radar. The possible ranges of the target signal frequency consequently embrace a bandwidth far wider than that essential to distinguish between multiple targets. The missile is therefore provided with a receiver having a very narrow bandwidth, and consequently extremely high selectivity, which may be tuned remotely from the ground or which may be caused automatically to sweep the span of expected target signal frequencies. Upon reception by the missile of a signal of sufficient amplitude and of proper frequency, the target is said to be acquired and the missile switches from beam-riding guidance to homing guidance. The switch over from beam-riding to homing may be delayed or controlled remotely from the ground in order to prevent operation against improper targets or to provide immunity against countermeasures taken by target aircraft.

Since the front antenna patterns possess appreciable lobes in the rearward direction, it is inevitable that a certain amount of energy will enter the front antennas directly from the tracking radar. The energy thus entering the system creates the spillover condition mentioned earlier herein. Unless precautions are taken excessive levels of spillover energy adversely effect the system operation by causing the automatic gain control to reduce the gain of intermediate frequency amplifiers and by causing the generation of harmonic signals within the target signal frequency band. In the system of the present invention many of the troublesome effects of spillover are eliminated by the use of extremely narrow bandpass filters and by the manner in which intermediate frequency signals are generated.

FIG. 2 illustrates fundamentally the airborne components of the missile guidance system in order that their broad functions may be related. As previously stated, the initial guided portion of the missile flight is under the control of a guidance radar and for the purpose of providing steering signals during that phase of flight, a beam rider receiver 30 is carried aboard the missile. Upon activation of the homing system by a command from the beam rider receiver to the homing enabling circuit 31 and acquisition of a target signal, control of the missile is switched from the beam rider receiver 30 to the homing system. The homing system includes the front interferometer antennas 32, 32′, a phase shifter 33, a front homing receiver 34, a rear homing receiver 35 and a steering signal computer 36.

As is explained at length in patent application S.N. 603,460, filed Aug. 10, 1956, by Gulick et al. for "Homing System," targets appearing angularly displaced from the missile axis by an amount $\beta$ will produce an electrical signal which differs in phase from a reference voltage in proportion to the sine of $\beta$. The function of the steering signal computer 36 is to receive the output of homing receiver 34, compare the phase of the receiver output with a reference signal from phase shifter 33 and remove the effects of missile motion by measurement of the angle $\psi$ with a gyroscope 37. The output of computer 36 is a steering signal voltage proportional to ($\beta \cos \beta - N\dot{\psi}$) which is used as the input to a wing servomotor 38. The wing servomotor 38 controls the deflection of a pair of steering wings or vanes on the missile and thus alters the course of the missile toward a collision point with the target.

Figure 3:
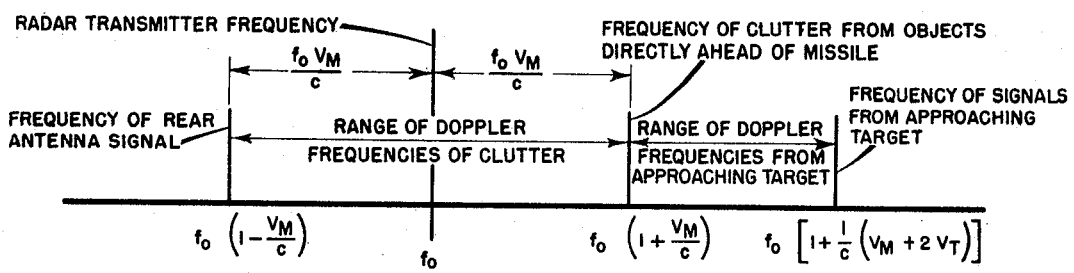
FIG. 3 is a chart illustrative of the Doppler frequency spectrum generated by relative missile and target motion.

With the operation of the missile thus broadly stated, the function and construction of the present invention will now be considered in detail. In FIG. 3 will be seen the range of Doppler frequencies present during the operation of the missile. Signals from stationary objects, i.e. clutter, are distributed within a bandwidth of $2f_0V_M/C$, wherein $V_M$ is the missile velocity and $C$ is the velocity of light, centered about the radar transmitter frequency $f_0$. The Doppler frequencies from an approaching target extend upwards from $$f_0\left(1+\frac{V_M}{C}\right)$$

to an upper limit of $$f_0\left[1+\frac{1}{C}(V_M+2V_T)\right]$$

which would be reached upon the missile and the target's approach of one another along a head-on course. If the target is receding, its Doppler signal would extend below the upper limit of clutter Doppler frequencies and in areas of intense clutter return would probably not be distinguishable from a stationary reflector. Therefore the case of approaching targets only will be considered hereinafter.

With a radar frequency of 5000 mc. s. and missile velocities of approximately $M=3$, the clutter frequency band would be about 30 kc. s. wide. This would place the frequency of the highest clutter signal at 5000.015 mc. s., while approaching targets would possess signal frequencies extending upwards from that frequency to perhaps 5000.045 mc. s. or higher. In order to distinguish a single target from amongst a plurality of targets and in order to provide immunity against countermeasures, the receiver must be capable of selecting within 100 cycles a signal ranging from 5000.015 mc. s. to 5000.045 mc. s. Thus it will be seen that very stringent requirements of frequency selectivity and stability (of the order of one part in 50 million) are necessary in a successful Doppler homing system.

Due to the fact that the radar transmitter frequency is a comparatively unstable quantity, many Doppler radars are provided with some means for heterodyning the Doppler possessing signal against the transmitted signal for the recovery of the Doppler signal alone. The requirement for nearly absolute stability in the transmitter frequency is thereby eliminated but such a system suffers from the unfavorable frequencies at which the signals must be amplified. It has heretofore been the practice to transpose the Doppler frequencies to a more favorable frequency range by mixing the transmitted signal, received by an antenna mounted on the rear of the missile, with a signal from a stabilized local oscillator, thus providing an intermediate frequency signal which includes missile Doppler information. The signals from the front interferometer antennas are mixed with the same local oscillator output to provide an intermediate frequency signal containing target Doppler information. Upon comparison of the front IF signal with the rear IF signal in a balanced modulator, a signal normally results having a frequency equal to the Doppler frequency due to the relative motion of the missile and the target. However, in the presence of spillover signals of even moderate power levels a direct current is generated in the balanced modulator which renders the modulator incapable of cancelling internally generated noise and causes improper automatic gain control action. It is further evident that proper operation of such a system would require precisely matched front and rear IF amplifiers, a fact which greatly complicates the production in volume of missiles thus equipped.

In the present invention, the Doppler frequency is derived in a closed loop mechanism which has the advantage of marked degeneration of internal noise and precise control of the receiver tuning. Basically, the system comprises a local oscillator, a mixer for combining the local oscillator signal with the incoming interferometer signal, a very narrow bandwidth intermediate frequency amplifier, and automatic phase lock means for controlling the frequency of the local oscillator so that the mixer output possesses a frequency component precisely centered in the pass band of the IF amplifier.

Figure 4:
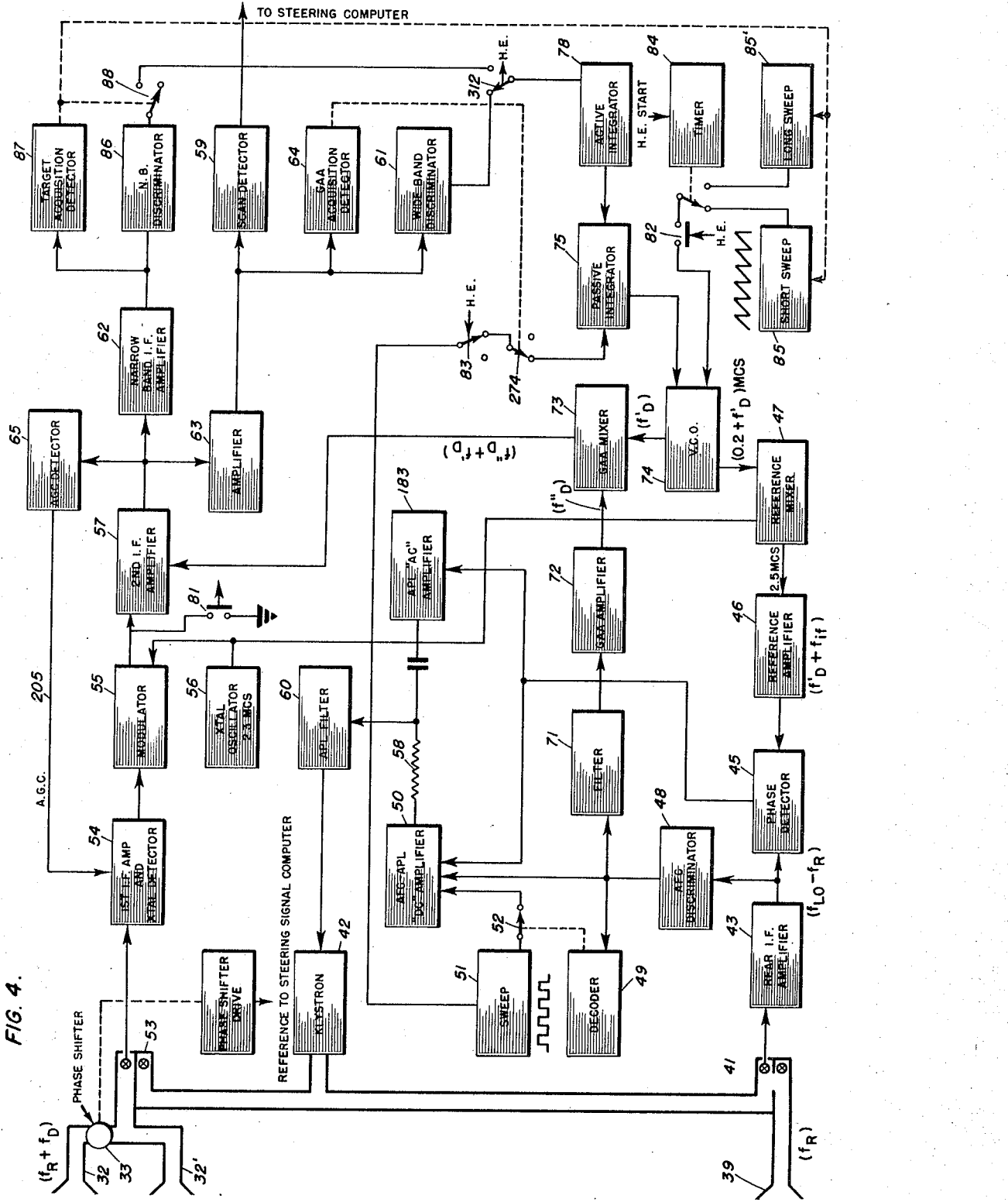
FIG. 4 is a functional block diagram illustrating the homing receiver of the present invention including ground-aided means for selecting a particular target Doppler frequency, target Doppler acquisition means and Doppler tracking means.

The block diagram of FIG. 4 illustrates the function of the various elements of the present invention. A crystal mixer 41 combines the rear antenna signal $f_R$ with the output $f_{LO}$ of a klystron local oscillator 42. The difference frequency signal $(f_{LO}-f_R)$ is highly amplified in a wide band rear IF amplifier 43. An AFC discriminator 48 receives the output of amplifier 43 and provides an output proportional to the difference in frequency between the input signal and 2.5 mc. s., the center frequency of discriminator 48. The output of discriminator 48 is applied to local oscillator 42, by way of a direct coupled amplifier 50 and filter 60, initially exerting a corrective action on the local oscillator frequency to insure that the local oscillator frequency will be higher than the frequency of the signal received in rear antenna 39 when phase lock, subsequently to be described, is allowed to occur. The output of amplifier 43 is also applied as one input to a phase comparator 45. A second input to phase detector 45 is formed by a signal $(f'_D+f_{if})$ having a frequency equal to the sum of the frequency of an assumed target Doppler signal $f'_D$ and the center frequency of IF amplifier 43. The output of phase detector 45, which is proportional to the difference in phase between the input signals $(f_{LO}-f_R)$ and $(f'_D+f_{if})$, is applied simultaneously to a direct coupled summing amplifier 50 and to an alternating current amplifier 183, the output of both amplifiers being added in a network 58 whence the sum is passed through a filter 60, one function of which is to add stability to the operation of the automatic phase lock frequency control system. From the filter 60, connection is made to the repeller electrode of the klystron local oscillator 42. The voltage thus applied to the klystron repeller alters the frequency of local oscillator 42 until the frequencies of the phase detector inputs are equal and their phase difference is 90°. Therefore the frequency of the local oscillator output is maintained equal to the sum of the frequency received by the rear antenna, $f_R$, the intermediate frequency $f_{if}$, and the assumed Doppler frequency $f'_D$.

The range over which the Automatic Phase Lock control will pull the controlled oscillator into synchronism is limited. It is therefore necessary to vary the frequency of oscillator 42 by means of a sweep generator 51 until the local oscillator frequency falls within the pull in range of the circuit. The signal from the CW transmitter is coded by frequency modulating the carrier at a predetermined frequency so that several radars may be operated within range of each other. As oscillator 42 is swept through the frequency band of the CW transmitter, discriminator 48 will detect the coding modulation present on the radar signal and supply the coding signal to a decoder 49. Upon the application of a proper coding frequency to the decoder 49, a relay is operated which opens the contacts 52 to interrupt the application of sweep voltage to the local oscillator 42. The combined action of discriminator 48 and phase detector 45 then brings the local oscillator precisely to the desired frequency.

The preceding are the elements of rear receiver 35 of FIG. 2, the following are the elements of front receiver 34.

The signals from the front antennas 32 and 32', one of which is being constantly and continuously shifted in phase by the phase shifter 33, are converted to the intermediate frequency, here selected to be 2.5 mc. s., in a crystal mixer 53. The 2.5 mc. s. intermediate frequency signal is amplified in a narrow bandwidth (1600 c.p.s.) amplifier 54 and applied to a modulator 55 whereupon the signal undergoes a second conversion in frequency to 0.2 mc. s. To accomplish the second conversion, the modulator 55 receives a signal from a highly stabile crystal controlled oscillator 56 having a frequency output of 2.3 mc. s. The 0.2 mc. s. signal is further amplified in a second IF amplier 57, the output of which is applied simultaneously to a narrow band IF amplifier 62 a relatively broad band amplifier 63 and an automatic gain control (AGC) detector 65. Following amplifier 63 are a scan detector 59, a ground aided acquisition (GAA) detector 64 and a wide band discriminator 61. Scan detector 59 detects ampliude modulation introduced in the RF signal by phase shifter 33 to provide the steering signal output supplied to computer 36 of FIG. 2. The utility of GAA detector 64 and discriminator 61 will shortly be disclosed.

The remainder of the circuit to be described is devoted to the selection of a desired Doppler signal and to the means for maintaining the receiver sharply in tune to the selected signal.

GROUND AIDED ACQUISITION (GAA)

Shortly after the missile is launched against a target tracked by the ground radar, computations commence at the ground control site of the missile velocity and the target velocity. From these factors, the Doppler frequency is computed in a manner which need not be considered in any detail as it is only incidental to the present invention. The computed Doppler frequency $f''_D$ is added to a constant frequency signal (400 kc. s.) for the purpose of frequency modulating, at a low deviation ratio, the CW illuminating radar signal. The rear end discriminator 48 recovers the FM signals which include both the identification code (300–360 kc. s.) and the predicted Doppler frequency (410–460 kc. s.) and applies these signals to the decoder 49 and to a GAA filter 71. The GAA filter 71 passes only the predicted Doppler frequency signal $(400+f''_D$ kc. s.) which is subsequently amplified in an amplifier 72 and applied as one input to a mixer 73. The mixer 73 combines the GAA predicted Doppler signal with the output of a voltage controlled oscillator 74. In order to locate the GAA signal $f''_D$, the frequency of the signal from oscillator 74 is swept from 210 kc. s. to 260 kc. s. by means of sweep voltage applied thereto from sweep generator 51. After location of the ground predicted Doppler frequency, $f''_D$, oscillator 74 is more precisely controlled by frequency corrective means shortly to be described. From mixer 73, the signal is applied to a second input on second IF amplifier 57 the input thereto from modulator 55 being disabled at this time. If the frequency of the signal output from mixer 73 lies within the pass band of amplifier 57, signal will be applied to GAA detector 64. Oscillator 74 is swept through the desired range by the application of the 2 c.p.s. square wave output of sweep generator 51 to a passive integrator 75 which produces a triangular wave output. Upon the appearance of an output from amplifier 63, indicating a coarse frequency alignment between the predicted Doppler frequency $f''_D$ and the frequency $f'_D$ of oscillator 74, GAA detector 64 opens contacts 274 on a relay to interrupt sweep voltage.

Upon the arrest of sweep voltage, the frequency $(200+f'_D)$ of oscillator 74 has reached a value proper to provide a frequency difference from mixer 73 of within 400 c.p.s. of 200 kc. s. Discriminator 61 then develops a direct error voltage proportional to the displacement of the output of amplifier 57 from 200 kc. s. The error voltage output of discriminator 61 is conducted through the normally closed contacts 77 of the homing enabling relay 31 (FIG. 2) to an active integrator 78. Integrator 78 performs an integration with respect to time upon the incoming error voltage and applies the error thus integrated to passive integrator 75. The doubly integrated error voltage is then applied to the frequency determining elements of oscillator 74 thereby adjusting the oscillator frequency in the direction to reduce the frequency error. Double integration of the error voltage in integrators 78 and 75 adds stability to the loop and the capability of retaining an accumulated charge for an appreciable time. Hence if signal from amplifier 57 is momentarily lost, oscillator 74 remains fixed in frequency due to the "memory" of the integrators.

TARGET ACQUISITION

The Ground Aided Acquisition circuits just described commence functioning shortly after the missile is launched or when a signal is received by rear antenna 39 from the CW illuminating radar, and are capable of receiving and following changes in the ground predicted Doppler frequency during the beam riding phase of the trajectory. The purpose of the provision of Ground Aided Acquisition is to narrow the field of search required of the missile to discover a moving target or to command the missile to select a particular target and to ignore other possible targets. Obviously no steering information is derived from the homing system during Ground Aided Acquisition operation. At a convenient time prior to the predicted intercept of the target by the missile, the GAA FM signal is removed from the CW illuminator beam and a coded signal is transmitted over the guidance radar which actuates the homing enabling relay. Upon reception of the homing enabling command, contact 82 is closed, contacts 81 and 83 are opened, contacts 312 switch from wide band discriminator 61 to narrow band discriminator 86 and the operation of a four second timer switch 84 is initiated. The second IF amplifier 57 is then capable of receiving signals from modulator 55 while, of course, no further signals are applied thereto by GAA mixer 73. The integrator 78 holds oscillator 74 at the ground predicted Doppler frequency while timer switch 84 is initially in a position to apply a sawtooth sweep voltage to the oscillator from a short sweep generator 85.

The short sweep generator 85 causes oscillator 74 to vary its frequency rapidly within a rather restricted frequency band (3.5 kc. s.) about the ground predicted Doppler frequency. In this manner, allowances are made for errors in the ground predicted Doppler frequency and the actual target Doppler frequency can be located much more rapidly than if the entire Doppler frequency spectrum of target signals were searched.

The assumed Doppler frequency $(f'_D+0.2$ mc. s.) output of oscillator 74 together with the sweep variations therein is carried forward through the automatic phase control loop previously described to produce a frequency component $(f'_D)$ in the output of klystron 42. Upon the appearance of a target signal $(f_R+f_D)$ at the front antennas 32, 32', the klystron frequency will shortly be swept to a value producing a difference frequency component of within 800 c.p.s. of 2.5 mc. s. A signal will then be amplified in the first IF amplifier 54, converted to 200 kc. s. in balanced modulator 55 and applied to the second IF amplifier 57. Upon the approach of the frequency difference component to within 400 c.p.s. of 2.5 mc. s., the output of balanced modulator 55 falls within the pass band of second IF amplifier 57 which then amplifies and conducts the signal to the narrow band IF amplifier 62. Upon the approach of the assumed Doppler frequency $f'_D$ of within 50 cycles of the target Doppler frequency $f_D$, amplifier 62 conducts the second IF amplifier output to a narrow band crystal discriminator 86 and to a target acquisition detector 87. Target acquisition detector 87 performs the dual function of arresting and holding the output of sweep generators 85 or 85' and of actuating the relay contacts 88. This latter function switches the output of the narrow band discriminator 86 to integrator 78 to provide more precise frequency tracking of the acquired target signal. Target acquisition detector 87 includes pause-lock circuits which control the operation of sweep generators 85 and 85'. Immediately upon the appearance of an output from amplifier 62, the sweep output of generators 85 or 85' ceases. As long as the output of amplifier 62 is sustained, sweep output is locked at the value first producing the output. If the output from amplifier 62 disappears, the target acquisition detector pauses approximately 0.1 second and then permits sweep generator 85 or 85' to resume operation. Upon reception of the homing enabling signal, timer 84 is initially in a position to deliver short sweep from generator 85 to oscillator 74. After the lapse of four seconds timer 84 switches the input to oscillator 74 from short sweep generator 85 to long sweep generator 85' allowing a greater portion of the Doppler spectrum to be searched.

In brief summary, the frequency of the signal received from a target is equal to the radar frequency $f_R$ at the rear of the missile plus the Doppler frequency $f_D$ due to target and missile motion. Upon subtracting this front end signal $(f_R+f_D)$ from the local oscillator signal $(f_R+f'_{2D}+2.5$ mc. s.) it will be seen that the difference can only equal 2.5 mc. s. if the actual target Doppler frequency $f_D$ and the assumed Doppler frequency $f'_D$ are equal. The departure from 2.5 mc. s. of this difference represents an error in the assumed Doppler frequency $f'_D$. Ground Aided Acquisition adjusts the frequency of voltage controlled oscillator 74, the output of which includes the component $f'_D$, to equal, hopefully, the target Doppler frequency $f_D$. Thus it will be seen that a signal having the target Doppler frequency does not appear in either the first IF amplifier 54 or the second IF amplifier 57, but only the constant frequency IF signals plus a component of the error in the adjustment of the frequency of oscillator 74. At this point it should be carefully noted that although a signal having the target Doppler frequency is not present in the output of IF amplifiers 53 and 57, the IF signals are nevertheless amplitude modulated by the phase shifter 33 and it is by detection of this amplitude modulation that steering signals are derived.

Figure 5:
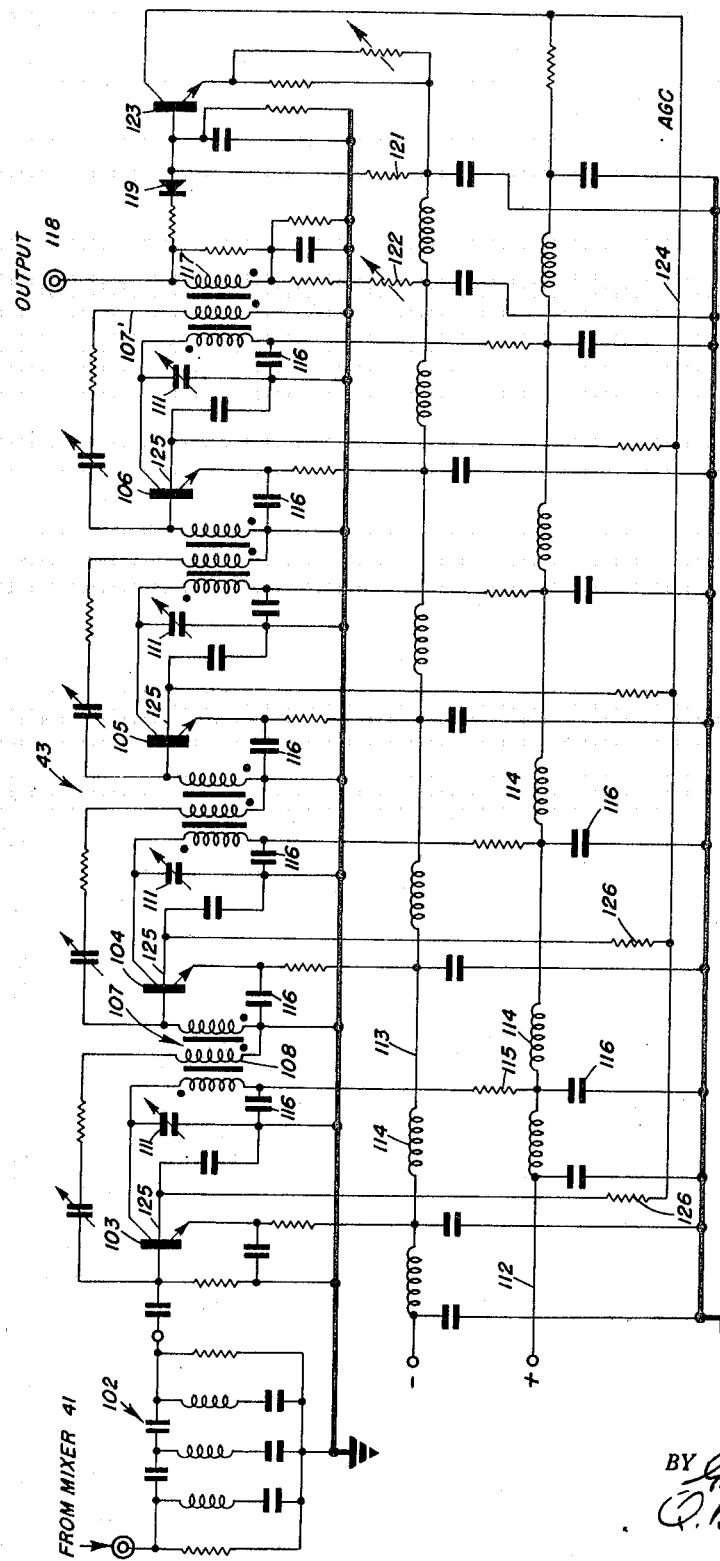
FIG. 5 is a schematic diagram of the rear IF amplifier illustrated in block form in FIG. 4.

In FIG. 5, rear IF amplifier 43 is illustrated in detail. The output of mixer 41 is applied to a high pass filter 102 tuned to pass the difference frequency product of mixer 41 for amplification. Four cascaded tetrode transistor amplifying stages 103, 104, 105, 106 follow the filter 102 to provide a substantial amount of gain. The amplifying stages 103–106 are coupled by transformers 107 each of which includes a neutralizing winding 108 from which a portion of the output of each stage is fed back through a network 109 to the base electrodes of each transistor. The transformers 107 are tuned to the IF frequency by shunt capacitors 111. Suitable operating voltages are applied to the transistor and collector electrodes through a positive bus 112 and negative bus 113. Interstage coupling through the power supply busses 112 and 113 is prevented by isolating and decoupling networks which include chokes 114, resistors 115 and capacitors 116 connected in a well known manner.

The output of amplifier 43 appears on winding 117 of the final IF transformer 107' from whence it is conducted through a jack 118 to phase detector 45 and AFC discriminator 48. A diode 119, having a threshold bias supplied by means of a fixed resistor 121 and an adjustable resistor 122, rectifies a portion of the output amplifier 43 for use as an automatic gain control (AGC) voltage. The AGC voltage of diode 119 is amplified in a grounded emitter amplifier 123 directly connected to diode 119 and to an AGC bus 124. The secondary base electrodes 125 of each of the stages 103–106 are connected to the AGC bus 124 through isolating resistors 126 thereby providing automatic gain control action for the amplifier 43.

Figure 6:
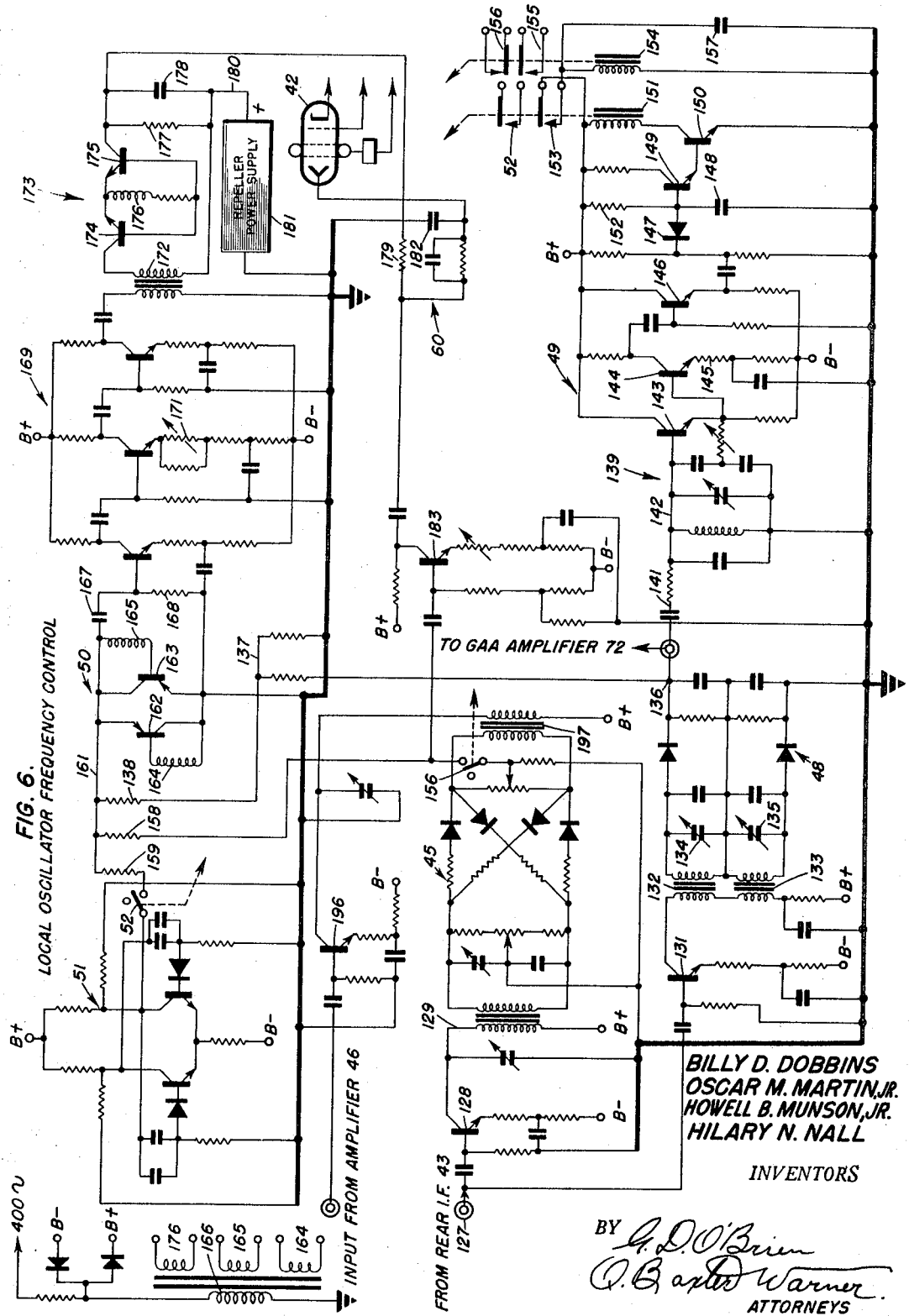
FIG. 6 is a schematic diagram of the local oscillator frequency control comprising a combination of several of the block forms of FIG. 4.

Referring to FIG. 6, jack 118 of amplifier 43 is connected to the input jack 127 of the phase detector 45. A grounded emitter amplifier 128 drives the input transformer 129 of phase detector 45. A second grounded emitter amplifier 131 receives the output of amplifier 43 through jack 127 and drives the input transformers 132 and 133 of the AFC discriminator 48. The discriminator 48 is a conventional detuned input type in which the secondaries of input transformers 132 and 133 are tuned by capacitors 134 and 135 to resonate on either side of the 2.5 mc. s. center frequency. The discriminator error voltage, appearing at junction 136 is proportional to the difference between the frequency of the output of amplifier 43 and the discriminator center frequency. The discriminator output is conducted through a voltage divider 137 to an input resistor 138 of summing amplifier 50. The discriminator output is also applied to the AFC decoder 49 through a coupling network 141. The AFC decoder may simply comprise a highly selective filter centered at the identification code frequency (300–360 kc. s.) of the radar illuminator. A Q-multiplier 139 is here employed to provide adequate selectivity, although obviously a highly selective passive filter might be used. The Q-multiplier 139 includes a filter 142 and a transistor amplifier 143. A portion of the output of transistor 143 is fed back to the filter 142 in a positive sense so that the transistor appears as a negative resistance in the filter and consequently neutralizes the resistance inherent within the filter. The Q of the filter is thereby greatly increased to provide a very selective filter characteristic.

A grounded emitter amplifier 144 is directly connected to the Q-multiplier transistor 143. An unbypassed resistor 145 in the emitter circuit of amplifier 144 increases the input resistance of the amplifier and stabilizes its gain. Amplifier 144 is coupled to a grounded collector amplifier 146, the output of which is rectified in a diode 147 connected to pass negative current to a capacitor 148. A relay amplifier comprising two cascaded transistors 149 and 150 controls the coil current of a relay 151. The relay amplifier is normally biased into a conductive state by a resistor 152 thereby maintaining closed a pair of contacts 153 on relay 151. Upon the accumulation of a sufficient negative charge on capacitor 148 to overcome the bias of transistor 149, as would occur upon the appearance of a coding signal of proper frequency, the relay amplifier is rendered nonconductive and contacts 153 open. The opening of contacts 153 disconnects the field of a second relay 154 from the positive voltage bus. However, the armature of relay 154 does not change its position immediately upon the opening of contacts 153 as the discharge of a capacitor 157 connected across the relay field coil sustains the field for approximately one-half second. This delay is introduced to prevent incorrect lock-on of the automatic phase control loop, as will shortly be described.

The armature of relay 154 carries two pair of contacts 155 and 156, the first pair 155 of which opens and the second pair 156 of which closes upon the relay's becoming de-energized. Contacts 155 normally short circuit the output of integrator 78 (FIG. 4) to prevent the accumulation of a charge therein during the initial stages of the missile's flight. Contacts 52, previously mentioned in connection with sweep generator 51 are mounted on relay 151 and open upon the interruption of current to that relay whereupon the application of sweep voltage to summing amplifier 50 is arrested.

Contacts 156 are connected between the output of phase detector 45 and a second input resistor 58 to summing amplifier 50. Since the phase detector 45 possesses considerably higher sensitivity than the discriminator 48 and since proper conditions for phase lock appear when the local oscillator frequency is both greater and less than the illuminating radar frequency, it is possible that, using phase control alone, the local oscillator 42 would be caused to lock at a frequency less than that of the illuminating radar and thereby render the entire system inoperable. Discriminator 48 is capable, however, of determining whether the local oscillator frequency is above or below that of the illuminating radar and by delaying the application of phase control for approximately one-half second, after the appearance of an output from decoder 49, by means of the delay in relay 154, proper frequency lock-on will be accomplished.

Sweep generator 51 is a conventional 2 c.p.s. symmetrical multivibrator providing a square wave output utilized both in sweeping local oscillator 42 to aid in locking on the illuminating radar frequency and in sweeping VCO 74 to aid in locking on the GAA frequency. Sweep is applied to local oscillator 42 through relay contacts 52 and a third input resistor 159 on summing amplifier 50. Following amplification in summing amplifier 50, the square wave is integrated by the APL filter 60 to provide a triangular wave which varies the local oscillator 42 through a sufficient frequency band to insure lock on with the illuminating radar frequency. Upon the appearance of an output signal from the AFC decoder 49 contacts 52 on relay 151 are opened thereby preventing further sweeping of the local oscillator frequency. The AFC-APL circuits then proceed to pull the local oscillator 42 into precise frequency alignment.

Summing amplifier 50 possesses three input resistors 138, 158 and 159, as mentioned. These input resistors meet at a common junction 161 to which is connected two switching transistors 162 and 163. The transistors 162 and 163 are driven from a conductive to a nonconductive state by the application of a 400 c.p.s. alternating voltage between their base and collector electrodes. The alternating voltage is derived from oppositely phased secondary windings 164 and 165 on a chopper transformer 166. The emitter electrode of transistor 162 and the collector electrode of transistor 163 are both connected to junction 161 so that the oppositely phased voltages on the transistor base electrodes simultaneously switch the transistors from a high impedance to a low impedance. The opposite connection of transistors 162 and 163 tends to cancel the biases generated therewithin and make the transistors perform more truly as a simple oscillating switch.

A coupling network consisting of a capacitor 167 and a resistor 168 couples the alternating voltage generated by the switching transistors 162 and 163 to a conventional three stage alternating current amplifier 169, the gain of which may be varied by means of a variable resistor 171. An output transformer 172 coupled to the final stage of amplifier 169 supplies the alternating signal of the amplifier to a demodulator circuit 173. Demodulator 173 comprises two series connected transistors 174 and 175 arranged to be switched from a conductive to a non-conductive state by the application of an alternating voltage between their base and emitter electrodes. The alternating voltage for controlling the demodulator is derived from a third secondary winding 176 on chopper transformer 166 thus commutating the output of amplifier 169 in synchronism with the operation of switching transistors 162 and 165. The pulsating D.C. output of demodulator 173 is smoothed in a filter consisting of resistor 177 and capacitor 178 and applied through an isolating resistor 179 to the APC filter 60. The return lead 180 of demodulator 173 is connected in series with the power supply 181 of the repeller electrode of the klystron local oscillator 42. Since the klystron repeller electrode is isolated from ground by a capacitor 182 in the APC filter 60, the frequency corrective output voltages of demodulator 173 are added to the normal repeller voltage thereby altering the local oscillator frequency as required.

In summing amplifier 50 the direct input voltages are converted to an alternating voltage, subsequently amplified and reconverted to direct current to provide an output completely free from the drift voltages encountered in a direct coupled amplifier. However, the frequency response of summing amplifier 50 is limited to about 2 c.p.s. while it is desired to provide response extending from direct currents to several hundred kilocycles for the proper operation of the automatic phase lock circuits. Therefore an A.C. amplifier 183 is connected from phase detector 45 to filter 60 in parallel with summing amplifier 50. Amplifier 183 is of the common emitter type and possesses a frequency response extending from about 1 c.p.s. to the required upper limit of frequency.

As previously described, the frequency of local oscillator 42 is stabilized at the frequency of the illuminating radar as received at the rear antenna plus 2.5 mc. s. plus the predicted target Doppler frequency. The means for introducing the predicted target Doppler frequencies into the control of the local oscillator frequency will now be described with reference to FIGS. 6 and 7.

Figure 7:
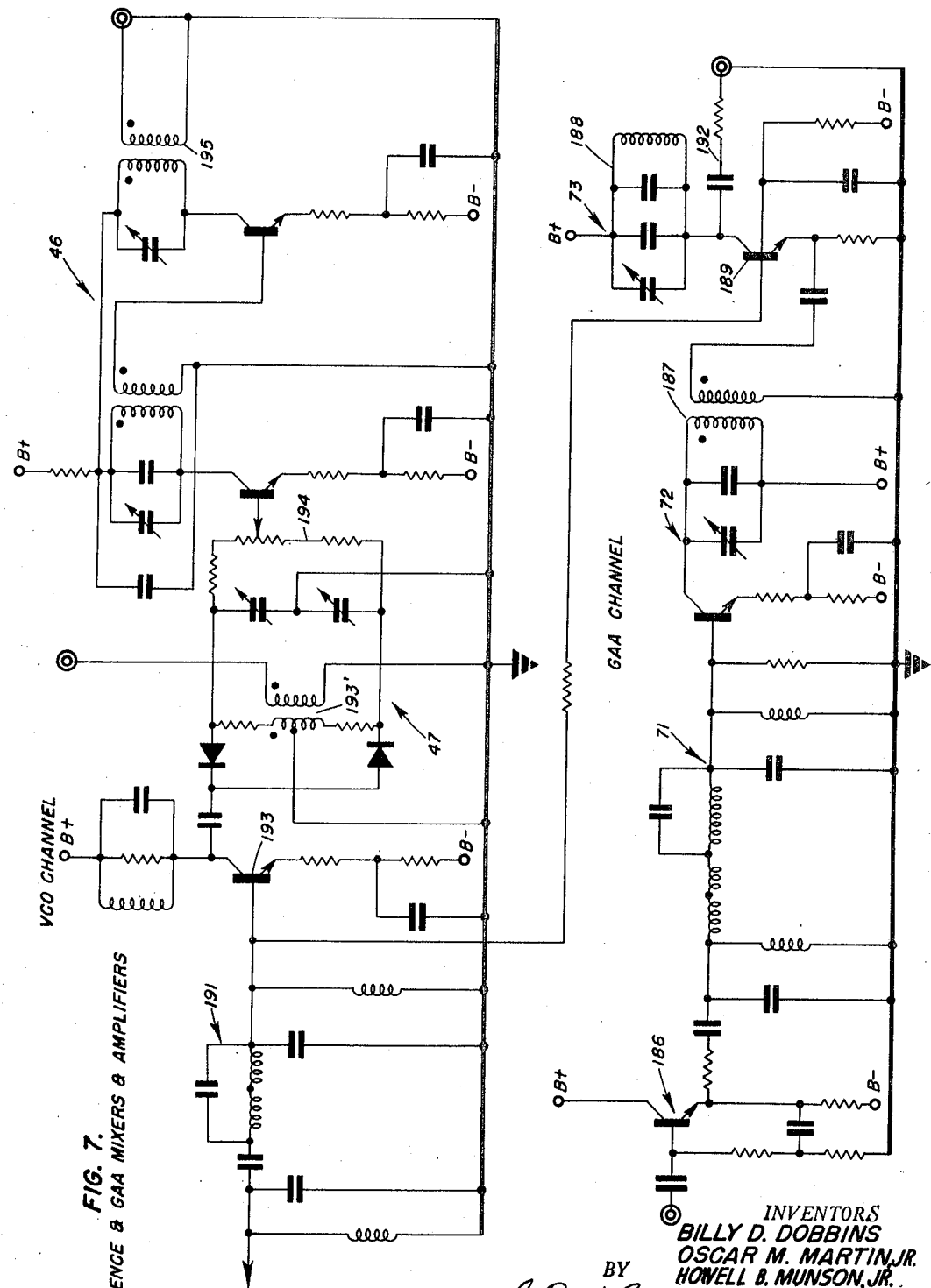
FIG. 7 is a schematic diagram illustrating the ground-aided acquisition means and mixing and amplifying means associated with the Doppler tracking circuits of FIG. 4.

Upon stabilization by the AFC circuits of the local oscillator frequency at a point where the identification code of the illuminating radar is detected, there will be present at the output point 136 of discriminator 48 (FIG. 6) the ground aided acquisition (GAA) signal frequency ($400 + f''_D$ kc. s.). Referring now to FIG. 7, output of discriminator 48 passes through an isolating amplifier 186 of the grounded collector type to the GAA filter 71 which rejects the radar identification signal and passes only that band of frequencies extending from about 400 to 460 kc. s. The GAA signal from filter 71 is amplified in a grounded emitter voltage amplifier 72 and coupled through a tuned transformer 187 to the GAA mixer 73. The mixer 73 is tuned to the frequency (0.2 mc. s.) of the front end second IF amplifier 57 by means of the resonant load 188 in the collector circuit of the mixer transistor 189. The signal output ($f'_D + 0.2$ mc. s.) of the voltage controlled oscillator 74 is applied through a band pass filter 191, adapted to reject signals other than $f'_D + 0.2$ mc. s., to the primary base electrode of transistor 189 where mixing with the GAA signal ($f''_D + 0.4$ mc. s.) occurs. The difference frequency product (0.2 mc. s. $+ f''_D - f'_D$) is coupled through a resistor-capacitor network 192 to the front end second IF amplifier 57 where subsequent circuit action causes the voltage controlled oscillator 74 to adjust its frequency to 0.2 mc. s. plus the ground predicted Doppler frequency, $f''_D$.

The output of filter 191 is also coupled through a tuned amplifier 193 to the reference mixer 47. The mixer 47 comprises a double diode paired modulator circuit in which the output of the crystal oscillator 56 is applied to a transformer 193' having a balanced secondary winding. The 2.3 mc. s. signal from oscillator 56 is suppressed by the normal operation mixer 47 and only the sum and the difference of the input frequencies are present in the balanced load 194 of the mixer. The difference frequency signal is rejected and the sum frequency is amplified by the two stage reference amplifier 46 which is tuned to the sum (2.5 mc. s.) signal. From the secondary winding 195 of the output transformer of amplifier 46, the 2.5 mc. s. signal containing the predicted Doppler frequency $f'_D$ is conducted to the input of a grounded emitter amplifier 196 (FIG. 6) supplying an input transformer 197 on phase detector 45. The phase detector 45 then operates to adjust the local oscillator frequency to equal exactly the frequency of the radar signal received by the rear antenna $f_R$ plus the IF frequency $f_{if}$ plus the assumed Doppler frequency $f'_D$.

Figure 8:
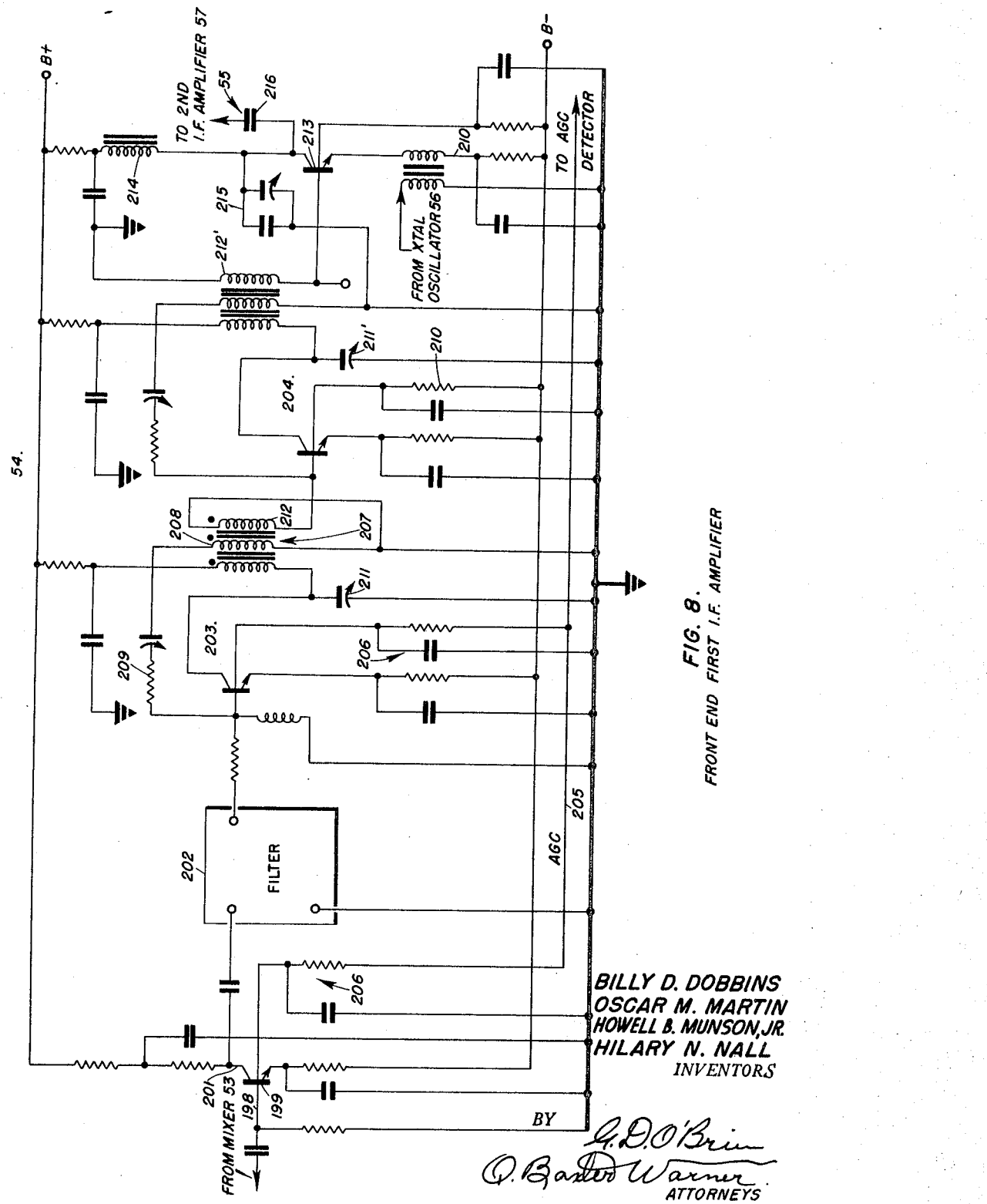
FIG. 8 is a schematic diagram of the front end first IF amplifier and modulator of FIG. 4.

Referring to FIG. 4, it will be recalled that the signal at the front antennas 32 and 32' differs from the rear antenna signal by the target Doppler frequency $f_D$. Upon the combination of the local oscillator signal with the front antenna signal in the mixer 53 there will be produced as an output a signal having a frequency equal to the IF frequency plus the assumed target Doppler frequency less the actual target Doppler frequency ($f_{if} + f'_D - f_D$). This signal is applied to the front end first IF amplifier 54, which will now be described with reference to FIG. 8.

The output of mixer 53 is applied to the primary base electrode 198 of a tetrode transistor preamplifier 199. The collector electrode 201 of amplifier 199 is coupled to a 2.5 mc. s. band pass filter 202 which is preferably of the crystal lattice type yielding a very sharp cutoff on either side of the pass band, here chosen to be 1600 c.p.s. wide. From the filter 202, the signal, nominally at 2.5 mc. s. frequency, but in actuality at 2.5 mc. s.$+ f'_D - f_D$ is applied to the first stage 203 of two cascaded tuned amplifier stages. Both the first tuned stage 203 and the second tuned stage 204 of amplifier 54 employ tetrode transistors. The secondary base electrodes of preamplifier 199 and amplifying stage 203 are connected to an automatic gain control voltage bus 205 through decoupling networks 206. The secondary base electrode of amplifying stage 204 receives fixed bias from a decoupled dropping resistor 210 connected to the negative power supply. Amplifier stage 203 is coupled to stage 204 through an interstage transformer 207 having a neutralizing winding 208 which provides negative feedback through a shaping network 209. Amplifying stage 203 is tuned to 2.5 mc. s. by means of a capacitor 211 shunted from the collector electrode to ground. Amplifying stage 204 receives its input from winding 212 on transformer 207 and is constructed similarly to stage 203 except for the provision of fixed bias on the secondary base electrode. A transformer 207' which is resonated at 2.5 mc. s. by capacitor 211' delivers the output of stage 204 and also provides neutralization for the stage. Transistor 213 serves as the modulator 55 of FIG. 4 wherein the 2.5 mc. s. output of amplifier 54 is combined with the 2.3 mc. s. signal from crystal oscillator 56 to produce the 0.2 mc.s. signal for the second IF amplifier 57.

Figure 9:
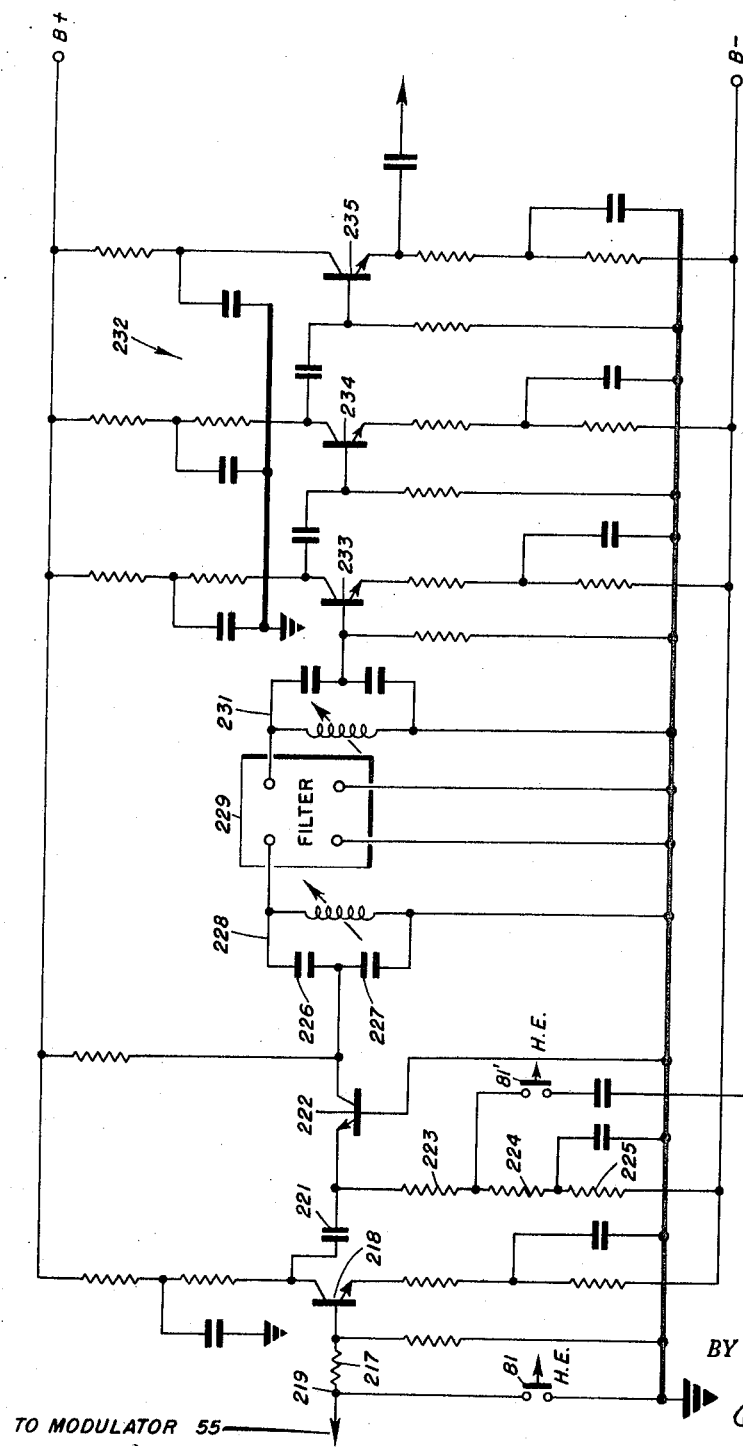
FIG. 9 is a schematic diagram of the front end second IF amplifier of FIG. 4.

An appropriate bias is applied through the secondary winding of an input transformer 210 to the emitter electrode of transistor 213 to cause non-linear operation. The primary of input transformer 210 is excited by the 2.3 mc. s. output of crystal oscillator 56. Modulator 55 is tuned to provide peak performance at 0.2 mc. s. by an inductor 214 and capacitor 215 placed in the circuit of the collector electrode of transistor 213. A capacitor 216, connected to the collector of transistor 213 couples the 0.2 mc. s. difference frequency signal to the input circuit of the second IF amplifier 57, which will now be described in detail with reference to FIG. 9.

From capacitor 216, the signal is applied to an isolating resistor 217 and from thence to the base electrode of a grounded emitter amplifier 218. The input point 219 of resistor 217 is connected through contacts 81 of the homing enabling relay 31 (FIG. 10) to ground. During the beam riding phase of flight, the contacts 81 remain closed to prevent the appearance of a signal in the front end first IF amplifier from appearing in the second IF amplifier and interfering there with the operation of the Ground Aided Acquisition circuits.

Figure 10:
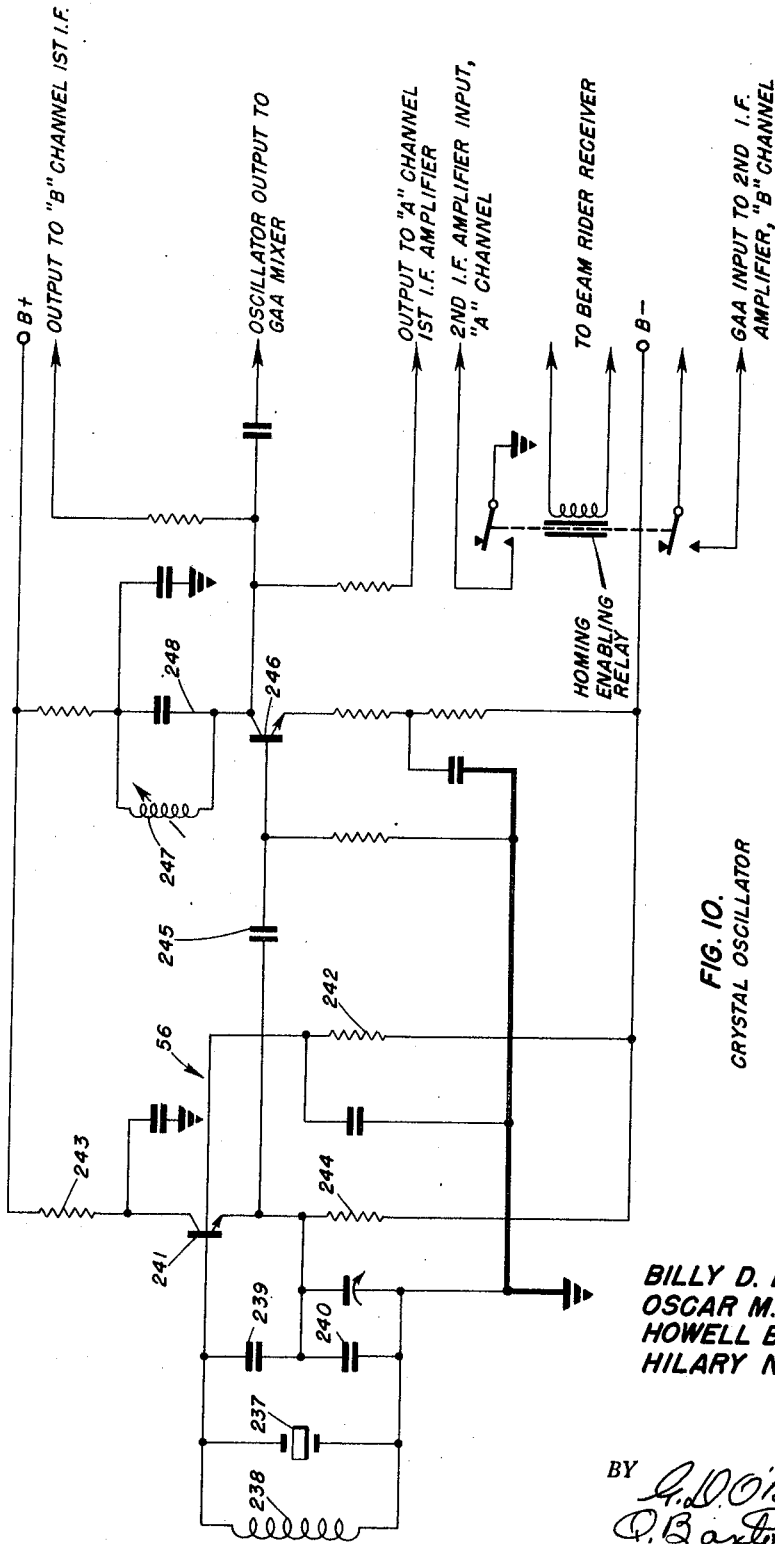
FIG. 10 is a schematic diagram of the crystal oscillator and homing enabling relay of FIGS. 4 and 2 respectively.

From the collector of amplifier 218, the front end IF signal is applied through a blocking capacitor 221 to the emitter of a grounded base amplifier 222. Bias is applied to the emitter of amplifier 222 through two series connected resistors 223 and 224 and a suitably by-passed dropping resistor 225 connected to the negative voltage supply. The output of GAA mixer 73 is applied to the junction of resistors 223 and 224 through the contacts 81' on the homing enabling relay 31 (FIG. 10). Upon the apearance of the homing enabling signal from beam rider receiver 30 to relay 31, contacts 81' are opened to prevent the output of GAA mixer 73 from interfering with the output of modulator 55.

The collector electrode of amplifier 222 is connected to the junction of two series connected capacitors 226 and 227 forming the capacitive branch of parallel resonant circuit 228 thereby coupling the signal output of the amplifier into the resonant circuit while blocking the flow of D.C. A band pass filter 229 of the crystal lattice type, tuned to the second IF frequency of 0.2 mc. s. and having a bandwidth of 800 c.p.s. measured at the −6 db points, is connected across the resonant circuit 228. At a bandwidth of approximately 5900 c.p.s., filter 202 (FIG. 8) affords −60 db attenuation, while the −60 db points are reached at a bandwidth of 3000 c.p.s. in filter 229. The combined action of filters 202 and 229 therefore provides better than 120 db attenuation of spillover signals.

An output circuit 231, resonated at the second IF frequency, is connected to the filter 229 and conveys the signals passed thereby to a three stage amplifier 232. The first two stages 233 and 234 of amplifier 232 are conventional grounded emitter resistance-capacitance coupled circuits, while the final stage 235 is of the grounded collector type providing a low impedance output for driving the discriminator and detector circuits illustrated in FIG. 11.

FIG. 10 illustrates the circuit of crystal oscillator 56. The oscillator frequency is determined by a crystal 237 forming a branch of a parallel resonant circuit which includes an inductor 238 and capacitors 239 and 240. The active element of the circuit is comprised by a tetrode transistor 241 connected around capacitor 239. The secondary base electrode and the collector electrode of transistor 241 are respectively biased through suitably by-passed resistors 242 and 243 connected to the B− and B+ supplies. The emitter of transistor 241 is connected through a load resistor 244 to the B− supply and supplies the oscillator output through a coupling capacitor 245 to the base electrode of a buffer amplifier transistor 246. Transistor 246 is connected as a grounded emitter amplifier with a tuned collector load comprising an inductor 247 and a capacitor 248. Outputs from the buffer amplifier are delivered to various circuits as indicated by the legends.

The circuits of scan detector 59, discriminators 61 and 86 and the AGC detector 65 will now be described with reference to FIG. 11. The output of second IF amplifier 57 is applied to junction point 251 whence it is conducted to scan detector 59, filter 250 and AGC detector 65. Filter 250 is of the crystal lattice type and preferably is of 100 c.p.s. bandwidth centered at 200 kc. s. From filter 250 which includes input and output trimming capacitors 252, 253, connection is made to the base electrode of a grounded emitter transistor amplifier 254 constituting the first stage of IF amplifier 62 (FIG. 4). Following amplifier 254 are three cascaded stages which complete amplifier 62. These stages comprise a tuned amplifier 255 and two grounded collector amplifiers 256 and 257 the latter of which feeds the linear narrow band discriminator 86 which has a crystal stabilized center frequency. A summing network 259 receives the output of discriminator 86 and enables the addition thereto of a direct voltage from a voltage divider network 261 for the purpose of balancing out any noise induced biases in the discriminator signal. From summing network 259 the narrow band discriminator signal is conducted to integrator 78 (FIG. 4) to enable tracking of the Doppler frequency, as previously described.

Figure 12:
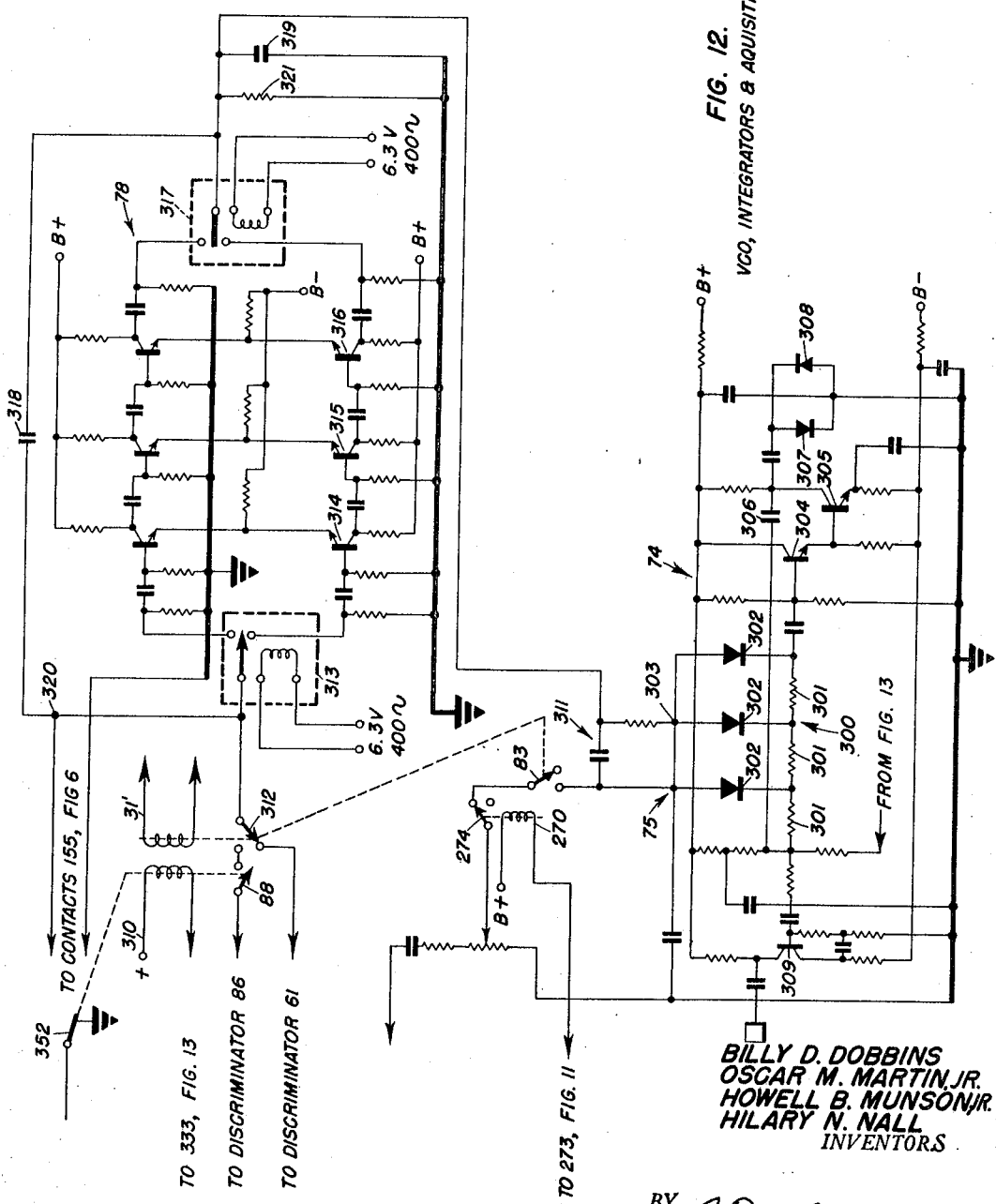
FIG. 12 is a schematic diagram of the voltage controlled oscillator, integrators and acquisition relays appearing in FIG. 4.

Returning to junction 251, the output from amplifier 57 is also applied to the base electrode of a transistor 262 connected as a grounded collector amplifier feeding a tuned amplifier 263. A voltage doubling rectifier circuit including crystal diodes 264 and 265 and capacitors 266 and 267 comprises scan detector 59 which detects the modulation envelope of the signal at junction 251. The detected envelope is filtered by the combined action of capacitors 266 and 267 and a resistor 268. The lower end of resistor 268 is connected to a potentiometer 269 for balancing noise bias and the upper end is directly connected to a variable resistor 271 in the base circuit of a grounded collector amplifier 272. The base electrode of a transistor 273, which is normally biased non-conductive, is connected directly to the emitter of amplifier 272. The emitter of transistor 273 is grounded while the collector is connected to the B+ supply through the coil of GAA acquisition relay 270 (FIG. 12). Transistor 273 thus serves as a switch which, upon being rendered conductive by the appearance of an output from scan detector 59, energizes relay 76 thereby opening contacts 274 and removing sweep voltage from passive integrator 75 (FIGS. 4 and 12).

The output of scan detector 59, constituting the $\dot{\beta} \cos \beta$ component of the steering signal, is applied through a coupling capacitor 275 to a grounded emitter amplifier 276 for amplification prior to entry into the steering computer 36 of FIG. 2.

Returning to amplifier 263, the output thereof is also applied through a coupling capacitor 277 to a double stage impedance converter consisting of grounded collector amplifiers 278 and 279 and thence to the input of the 800 c.p.s. bandwidth crystal discriminator 61. A summing network including resistor 281 combines the output of discriminator 61 with a noise balance voltage derived from a voltage divider 282. From resistor 281 the discriminator output is conducted through the contacts 312 (FIG. 12) on the homing enabling relay to the active integrator 78 (FIGS. 4 and 12).

Returning to junction 251, the output of second IF amplifier 57 is applied through an isolating resistor 280 to a grounded collector amplifier 283 serving as an impedance converter and thence to a tuned amplifier 284. The output of amplifier 284 is rectified in a voltage doubling circuit constituting the AGC detector 65 (FIG. 4). Detector 65 includes crystal diodes 285 and 286, capacitors 287 and 288 and a resistor 289. A potentiometer 291 connected from the B− supply to ground biases the output of detector 65 suitably for the operation of a grounded collector impedance converting stage 292 following. The AGC bus 205 is supplied from the emitter electrode of stage 292.

The gain v. AGC voltage characteristic of first IF amplifier 54 (FIG. 4) exhibits a gain peak at a finite AGC voltage. Instability in amplifier 54 would ordinarily result from this behavior since on either side of the peak the same value of gain is obtained for different values of AGC voltage. In order to eliminate instability, the negative excursion of the AGC voltage is limited by a clamp circuit which prevents the AGC voltage from becoming sufficiently negative to raise the gain of amplifier 54 to its peak value. The AGC clamp is constituted by the series chain of a pair of zener-type diodes 293 and 294 and a low-valued resistor 295 leading from ground to the B− supply. Diodes 293 and 294 are connected to oppose normal current flow. A crystal diode 297 is then connected from junction 296 to the AGC bus 205 in such a direction as to block current flow for AGC voltages more positive than the limiting voltage at the junction. The clamp circuit functions conventionally. Upon a tendency of the AGC voltage to become more negative than the desired limit, diode 297 conducts, effectively providing a voltage source which is constant at the desired limit.

It will be recalled that upon the activation of the homing enabling relay 31, a sweep voltage is applied to voltage controlled oscillator (VCO) 74, the sweep voltage being first of short duration and then switching to longer duration if no target is located within four seconds. The sweep generator 85 and VCO 74 will next be described with reference to FIGS. 12 and 14, following which reference will again be made to FIG. 11 for description of the target acquisition detector 87 and to FIG. 13 for description of the pause-lock circuit.

Referring now to FIG. 12, the voltage controlled oscillator (VCO) 74 is of the phase shift type employing a phase shift network 300 comprising resistors 301 and zener-type diodes 302. One characteristic of the zener-type diodes 302 is that their effective capacitance varies with the voltage applied thereto. Consequently by varying the voltage on the common lead 303 of diodes 302 the amount of phase shift that will be experienced by a signal of specified frequency in traversing network 300 can be controlled. A common collector impedance converter 304 receives the signal from network 300 and applies it to a common emitter gain stage 305. A capacitor 306 feeds the amplified signal from stage 305 back to the input of network 300 thereby providing for the generation of sustained oscillations. The frequency of oscillation depends upon the frequency at which the network 300 provides 180 degrees phase shift and, as noted, the phase shift varies in accordance with the voltage across diodes 302. Therefore the frequency of oscillator 74 depends upon the control voltage applied to network 300. The amplitude of the output of oscillator 74 is, however, frequency dependent and to prevent undesirably large outputs a limiter network comprising a pair of diodes 307 and 308 are shunted across gain stage 305. These diodes possess an appreciable zener voltage and therefore do not conduct so long as the magnitude of the output of stage 305 is less than the zener voltage. If the output of stage 305 exceeds the zener voltage, however, diodes 307 and 308 conduct thereby limiting the output to the zener voltage. a frequency compensated grounded emitter amplifier 309 is provided as a buffer stage for isolating oscillator 74 from the reference mixer circuit 47 and GAA mixer 73, both of which, as may be seen in FIG. 4, utilize the oscillator output.

Control voltage for oscillator 74 is derived during Doppler frequency tracking of a target by integration of the output of narrow band discriminator 86 in the active integrator 78 and by further integration in the passive integration network 311. The course of this control voltage will now be traced.

The output of narrow band discriminator 86 is conducted through the contacts 88 on target acquisition relay 310, the operation of which will shortly be described, and through the contacts 312 of homing enabling relay 31'. Homing enabling relay 31' is here illustrated as being separate from homing enabling relay 31 of FIG. 10. It will be understood of course that relays 31 and 31' may suitably be combined in a single, multiple contact relay. Contacts 312 constitute a single pole-double throw switch, the arm of which is connected to the input of integrator 78 so as to apply thereto the ouput of wide band discriminator 61 during beam riding and the output of narrow band discriminator 86 during homing.

The input to integrator 78, under ordinary circumstances, is either a low-level direct current or very low frequency alternating current. It is important therefore to eliminate sources of bias or drift therein so that high gain integration may be employed to provide more sensitive control of the frequency of oscillator 74. Ordinarily, a direct current integrator requires the use of direct coupled amplifiers which are notoriously prone to drift. Integrator 78, however, employs a high gain push-pull alternating current amplifier which is drift free. The direct current input to integrator 78 is converted to current alternating at 400 c.p.s. by a chopper 313 driven by the missile alternating current supply. Following conversion to A.C., the signal is amplified in three push-pull stages 314, 315 and 316. A second chopper 317 synchronized with chopper 313, reconverts the amplified alternating current signal to a direct current. The direct current output of chopper 317 is of opposite polarity to the input of chopper 313. A capacitor 318 is connected from the output arm of chopper 317 to the input arm of chopper 313 thereby providing the inverse capacitive feedback necessary in the construction of an active integrator. A filter comprising a capacitor 319 and shunt resistor 321 connected from the arm of chopper 317 to ground smooths chopper communication hash from the output of integrator 78, whence the output is applied to passive integration network 311. At junction 320 connection is made to the shorting contacts 155 on relay 154 (FIG. 6) which prevent the accumulation of a charge on capacitor 318 until decoder 49 (FIGS. 4 and 6) signals the reception of properly coded fm signal from the radar beam.

Figure 11:
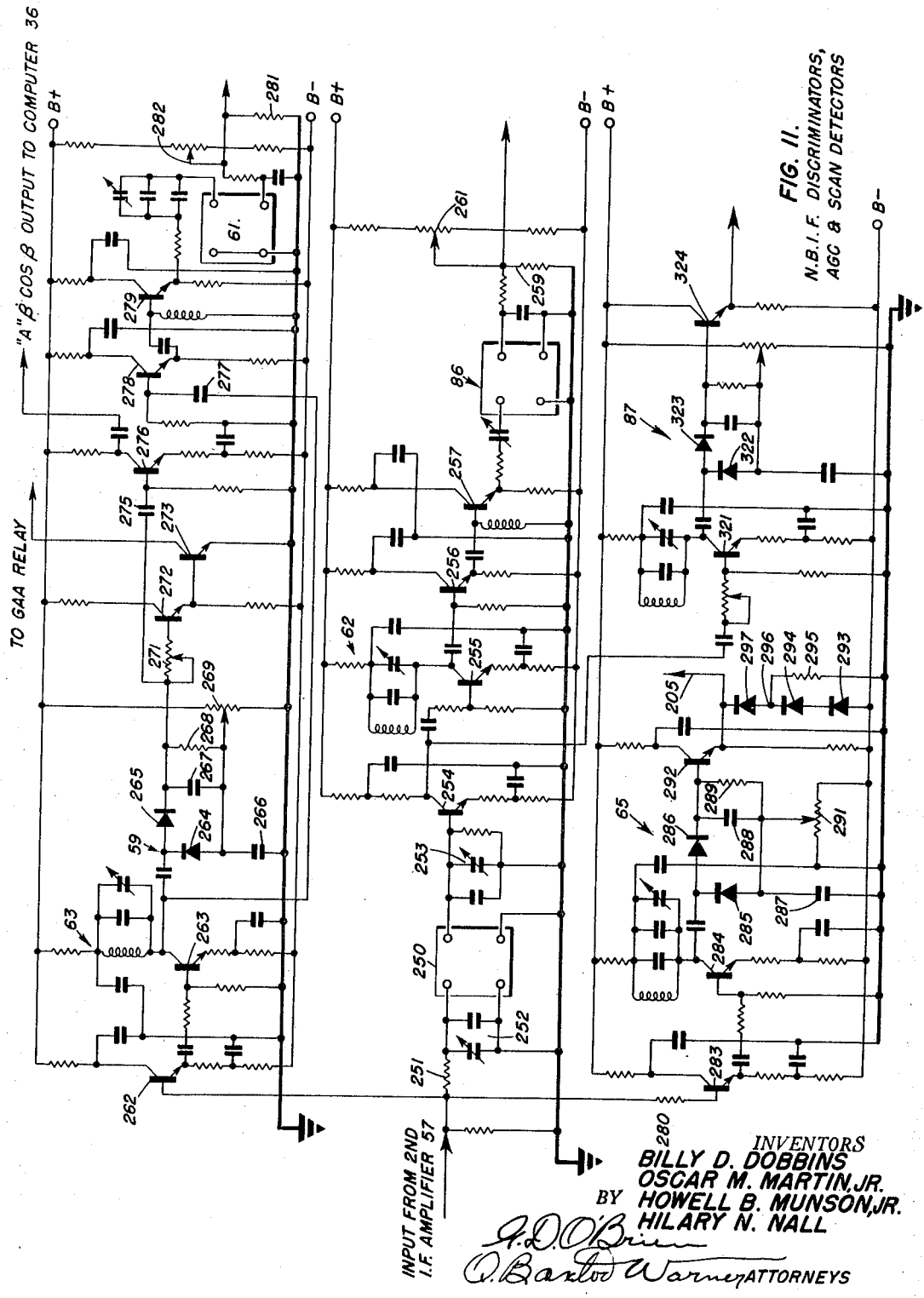
FIG. 11 is a schematic diagram illustrating the circuits of the scan and AGC detectors, and narrow band and wide band discriminators functionally represented in FIG. 4.
Figure 13:
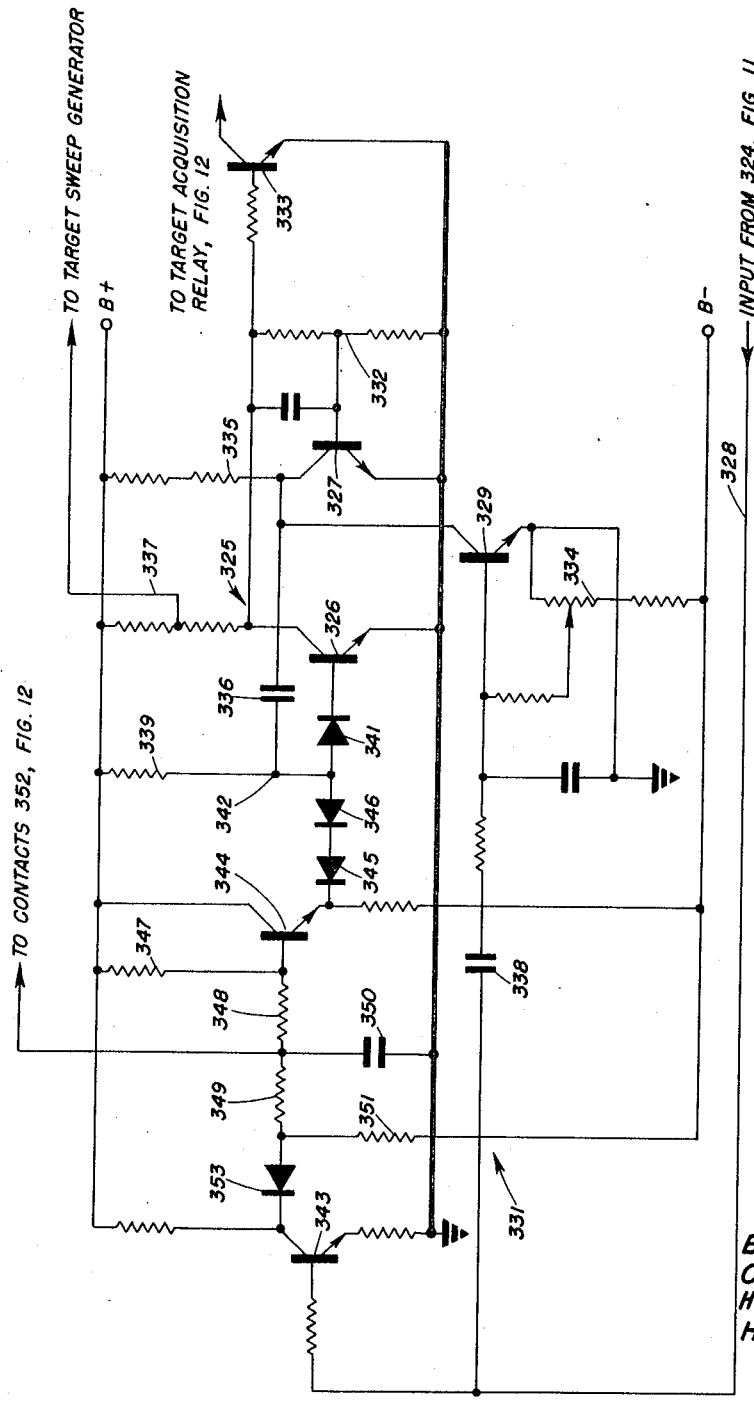
FIG. 13 is a schematic diagram of the pause-lock circuits which function in cooperation with the target acquisition detector of FIG. 4.

Reference is now made to FIG. 11 and shortly thereafter to FIG. 13 for disclosure of the means actuating contacts 88 on target acquisition relay 310. These means are entitled more specifically as the target acquisition detector 87 and the pause-lock circuit of FIG. 13. It will be recalled that after actuation of the homing enabling relay 31 a target sweep voltage is applied to VCO 74, the purpose of which is to correct for errors in the predicted target Doppler frequency. When the frequency of local oscillator 42 reaches such a value as to cause a signal to fall within the pass band of narrow band IF amplifier 62 the sweeping operation is interrupted and tracking of the target frequency commences.

FIG. 11 illustrates the target acquisition detector 87. Output from tuned amplifier 254 is applied to a tuned amplifier 321 and thence to detector 87 which comprises a pair of diodes 322 and 323 connected as a voltage doubler. Detector 87 develops a positive voltage output upon the appearance of a signal at the output of filter 62. A direct coupled grounded collector impedance converter 324 transfers the output of detector 87 to the pause-lock circuit of FIG. 13.

The pause-lock circuit functions to arrest the operation of target sweep generators 85 upon the first appearance of an output from target acquisition detector 87. The sweep generator is caused to "pause" at the value producing detector output. If a target is responsible for the interruption of sweep, the output of detector 87 will be sustained and sweep generator 85 is "locked" against further operation. If the output of detector 87 is due merely to a noise burst however, sweep operation will be continued after the lapse of a predetermined pause period. The pause-lock circuit will now be described with reference to FIG. 13.

A multivibrator 325 including transistors 326 and 327 performs the operation of energizing target acquisition relay 310 (FIG. 12) and arresting target sweep generator 85. Input to multivibrator 325 is from impedance converter 324 (FIG. 11), connected to lead 328 through a trigger amplifier 329 and through a directly connected lock amplifier 331. Prior to target acquisition, transistor 326 is biased for conduction resulting in a low collector voltage. The collector voltage from transistor 326 is further reduced in a voltage divider 332 and applied to the base of transistor 327 where it is insufficient to cause appreciable conduction in transistor 327 and consequently collector voltage from transistor 327 will be high. Collector voltage from transistor 326 is also applied to a grounded emitter transistor 333 whose collector is returned to B+ through the coil of target acquisition relay 310 (FIG. 12), but again due to the low output voltage of transistor 326, transistor 333 does not conduct. Trigger amplifier 329 is biased slightly below the threshold of conduction by a voltage divider 334. Upon the appearance of an output from impedance converter 324, trigger amplifier 329 conducts heavily drawing current through the load resistor 335 of transistor 327 and through a feedback capacitor 336. This action sharply reduces the positive bias applied to the base of transistor 326, switching that transistor to a non-conductive state and rendering transistor 327 conductive. With transistor 326 non-conducting, transistor 333 conducts to energize target acquisition relay 310. Also a positive voltage of increased magnitude is applied through lead 337 to the target sweep generator 85 to halt sweep operations. Trigger amplifier 329 shortly returns to a non-conductive state, however due either to the disappearance of output from converter 324 or to the blocking action of capacitor 338 through which signal is applied to the amplifier. If the output from converter 324 is sustained, lock amplifier 331 holds transistor 326 non-conductive. If, however, output has disappeared from converter 324, transistor 326 does not immediately conduct but a finite "pause" time must first lapse. The pause time is determined by the time required for capacitor 336 to charge sufficiently positive through a resistor 339 connected from B+ to the capacitor to force conduction of a diode 341 connected between the base of transistor 326 and the junction 342 of resistor 339 and capacitor 336. Upon conduction of diode 341 and the consequent conduction of transistor 326, transistor 327 will again be rendered non-conductive and sweep operations resume.

Lock amplifier 331 includes transistors 343 and 344 and gating diodes 345 and 346. In order for transistor 326 to be locked in a non-conductive condition, junction 342 must be rendered sufficiently negative to prevent conduction in diode 341. This is accomplished by reducing the current output of transistor 344 thereby permitting its emitter voltage to become sufficiently negative to allow conduction of diodes 345 and 346. When diodes 345 and 346 conduct, the potential at junction 342 is reduced sufficiently to prevent conduction in diode 341 and transistor 326 is locked in a non-conductive condition. The conduction of transistor 344 is controlled by transistor 343 which, in turn, responds to impedance converter 324 in the following manner.

Transistor 344 is biased by a network including resistors 347, 348, 349 and 351, and a capacitor 350. During sweep, capacitor 350 is shorted to ground through a pair of contacts 352 on target acquisition relay 310 (FIG. 12). The voltage at the junction of resistors 347 and 348 is therefore of a relatively high positive value causing transistor 344 to conduct relatively heavily. At this time the output of impedance converter 324 (FIG. 11) is at a low level resulting in light conduction in transistor 343 with a consequent high collector voltage from that transistor. A zener-type diode 353 functions similarly to a bias cell to introduce a fixed voltage drop from the collector of transistor 343 to the junction of resistors 349 and 351 and thus maintains that junction at a potential relatively close to zero. When an output appears from impedance converter 324, transistor 343 conducts more heavily reducing its collector voltage. The potential at the junction of resistors 349 and 351 becomes negative and capacitor 350, now unshorted, acquires a negative charge due to the fact that the sum of the resistance of resistors 347 and 348 is greater than that of resistors 349 and 351. The base voltage and consequently the conductance of transistor 344 is accordingly reduced, thereby locking transistor 326 in a non-conductive state.

In FIG. 4 the four-second timer 84, and the target sweep generators 85 and 85′ were illustrated as separate circuits. This representation is functionally correct, but for simplicity of construction sweep generators 85 and 85′ are constituted by a single oscillator provided with appropriate means for modifying the output amplitude.

Figure 14:
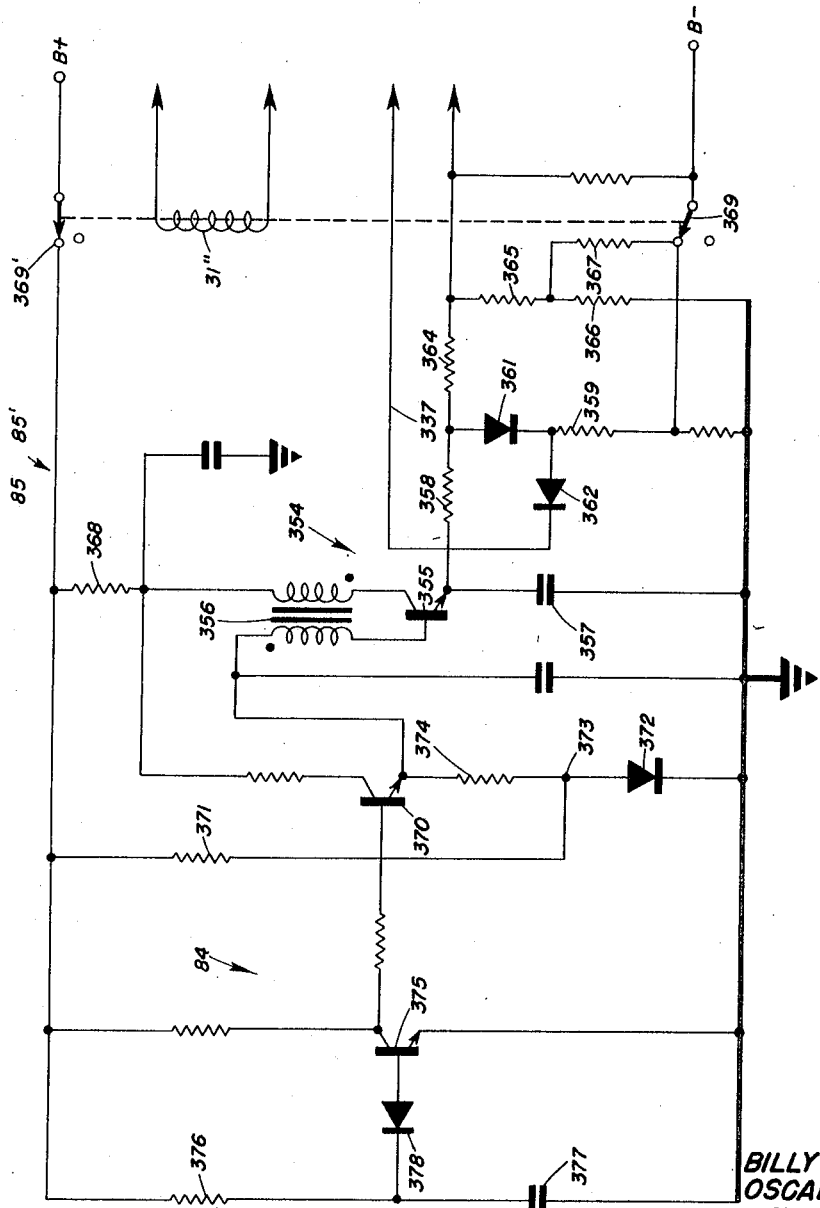
FIG. 14 is a schematic diagram of the timer and short and long sweep generators of FIG. 4.

Referring to FIG. 14, a blocking oscillator 354 comprises the basic sweep generator 85. Oscillator 354 includes a transistor 355 and the usual transformer 356 regeneratively connected from the transistor collector to base. A blocking capacitor 357 receives large current pulses through the emitter of transistor 355 and rapidly charges sufficiently positive to bias transistor 355 into non-conduction. Capacitor 357 then discharges slowly through a network comprising resistors 358 and 359 and a diode 361 to provide a sawtooth sweep voltage for application to VCO 74. A gating diode 362 of the zener-type is connected through lead 337 to a division point in the load of multivibrator transistor 326 (FIG. 13). The pause-lock circuit arrests sweep operation by developing on lead 337 a positive voltage of magnitude sufficient to break down diode 362 and thereby applying sufficient inverse voltage to prevent discharge of capacitor 357 through diode 361. The voltage output of capacitor 357 will therefore remain constant at the value resulting in target acquisition and will continue to sweep downward from that value if acquisition is lost. By means of a network including resistors 364, 365, 366 and 367, a fixed negative bias is added to the sweep voltage output of capacitor 357 to center the sweep about the zero potential axis. From the junction of resistors 364 and 365 the centered sweep voltage is conducted to the phase shift network 300 of VCO 74 (FIG. 12).

During the beam riding phase of the missile's flight, the target sweep generator 85 is inactive. Upon switchover to homing, contacts 369 and 369′, on homing enabling relay 31″, here shown as a separate relay, apply power to blocking oscillator 354, and to timer 84. Blocking oscillator 354 initially operates as short sweep generator 85 providing an output of reduced amplitude at a frequency which may suitably be 2 c.p.s. At the expiration of 4 seconds from the energization of homing enabling relay 31″, blocking oscillator 354 is converted to long sweep generator 85′ providing a sweep voltage output which may suitably be of twice the amplitude and half the frequency of the short sweep voltage. Conversion of oscillator 354 from short sweep to long sweep is accomplished in the following manner.

Transformer 356 receives power from the B+ supply through a resistor 368. A transistor 370 also receives power through resistor 368 so that when transistor 370 is conducting heavily, as is initially the case, the voltage applied to transformer 356 is considerably reduced and the current output of transistor 355 is reduced. This results in a lower amplitude or short sweep output from capacitor 357. Transistor 370 performs the additional function of elevating the positive base bias of transistor 355 and consequently of elevating the potential at which capacitor 357 blocks current flow in that transistor. When current flow through transistor 370 is reduced, the voltage applied to transistor 355, will be increased resulting in increased charging of capacitor 357 and thereby providing a long sweep of increased magnitude. Simultaneously, reduced conduction in transistor 370 depresses the base bias of transistor 355 requiring capacitor 357 to discharge to an even lower level before transistor 355 is unblocked and the sweep cycle is repeated. Variation in the base bias of transistor 355 in accordance with the conduction of transistor 370 causes both the long sweep and the short sweep output of capacitor 357 to be symmetrical about the same positive D.C. axis and thus the single voltage divider composed of resistors 364, 365, 366 and 367 is adequate for cancelling D.C. bias from both the long and short sweep voltages.

Connection of transistor 370 to the base of transistor 355 will now be described. A voltage divider comprising a resistor 371 and a diode 372 is connected from B+ to ground. A potential is thus developed at the junction 373 of resistor 371 and diode 372 which is substantially independent of the current in diode 372. The emitter of transistor 370 is connected to junction 373 through a resistor 374 and to the base of transistor 355 through the secondary of transformer 356. Conduction of transistor 370 increases its emitter voltage which adds to the voltage at junction 373 and thereby elevates the base bias of transistor 355. When transistor 370 is rendered non-conductive by the action of timer 84, shortly to be described, the base bias of transistor 355 is substantially the voltage at junction 373, and is consequently depressed.

Timer 84 comprises a grounded emitter transistor 375 and a charging circuit including a resistor 376 and a capacitor 377. Capacitor 377 is initially uncharged so that a zener-type diode 378 connected from the base of transistor 375 to the junction of resistor 376 and capacitor 377 blocks base bias rendering transistor 375 nonconductive. The collector voltage of transistor 375 is then high causing transistor 370 to conduct heavily and oscillator 354 to generate a short sweep output. Approximately four seconds after the closure of relay contacts 369', however, capacitor 377 will have charged sufficiently positive to break down diode 378. Transistor 375 then conducts, reducing the conduction of transistor 370 which causes oscillator 354 to generate a long sweep output.

This invention has now been described in sufficient detail to enable its construction by persons skilled in the art. It has been described however with respect to but a single control channel, that is, for control of the missile either in the yaw plane, the pitch plane or a combined plane, there being no essential difference of operation for any channel chosen. In a complete homing system, however, an additional pair of interferometric antennas are required. The second pair of antennas are mounted in a plane perpendicular to the plane containing antennas 32 and 32' and include an additional phase shifter and mixer similar to those disclosed at 33 and 53 in FIG. 4. It is unnecessary to duplicate the entire system of FIG. 4, however, as the local oscillator 42, the GAA and the target acquisition circuits are common to both control channels. All that is required to be duplicated, in addition to the antennas, phase shifter and mixer just mentioned, are the first IF amplifier 54, the modulator 55, the second IF amplifier 57, the AGC detector 65 and the scan detector 59. These items are identical in construction and operation to their counterparts and therefore require no separate description.

Obviously many modifications and variations of the present invention are possible in the light of the above teachings. It is, therefore, to be understood that within the scope of the appended claims the invention may be practiced otherwise than as specifically described.

What is claimed is:

1. In apparatus for remotely guiding a vehicle toward a moving target, said apparatus including a radio transmitter for illuminating the target, the combination comprising a superheterodyne receiver aboard the vehicle, said receiver including a local oscillator and a mixer for reducing received signals to an intermediate frequency, and means for controlling the frequency of said local oscillator to such a value as to eliminate from the intermediate frequency output of said mixer the Doppler frequency components generated by relative motion between the vehicle and the target.

2. In apparatus for guiding a vehicle toward a moving target, said appartus including a radio transmitter remotely situated from the vehicle and arranged to illuminate the target, the combination comprising, a superheterodyne receiver carried aboard the vehicle for receiving echoes from the target, said receiver including a local oscillator and a first mixer for reducing signals received directly from said transmitter to an intermediate frequency, means also aboard the vehicle for generating a signal having a frequency component equal to the Doppler frequency resulting from relative vehicle and target motion, means combining the outputs of said first mixer and said Doppler signal generating means for controlling the frequency of said local oscillator, a second mixer aboard the vehicle for combining the output of said local oscillator with signals reflected by said target and received by said missile to provide a difference frequency, and means responsive to said difference frequency for controlling the frequency of said Doppler signal generating means.

3. Apparatus as claimed in claim 2 with additionally, means aboard the vehicle and controllable by said radio transmitter for presetting the frequency of the output of said Doppler signal generating means.

4. In a guided missile homing system of the semi-active type involving the illumination of a target by a remotely situated radio transmitter, a system for receiving target signals identified by a characteristic Doppler frequency resulting from relative motion between the missile and the target, comprising, a local oscillator aboard the missile, a rear receiver including a rear mixer for combining the signal received directly from said radio transmitter with the output of said local oscillator and a rear amplifier for amplifying the output of said rear mixer, a front receiver including a front mixer for combining signals reflected from said target with the output of said local oscillator and a front amplifier for amplifying the output of said front mixer, means aboard the missile for generating a signal having a frequency component equal to the Doppler frequency characterizing relative motion of said target, means responsive to the output of said rear amplifier and to the output of said Doppler frequency generating means for controlling the frequency of said local oscillator, and means responsive to the output of said front amplifier for controlling the frequency of said Doppler frequency generating means.

5. Apparatus as claimed in claim 4 with additionally, means associated with said rear receiver and responsive to signals therefrom for presetting the frequency output of said Doppler frequency generating means.

6. Apparatus as claimed in claim 4 wherein said means for controlling the frequency of said local oscillator includes means responsive to the relative phase between the output of said Doppler frequency generating means and the output of said rear amplifier.

7. Apparatus as claimed in claim 4 wherein said means for controlling the frequency of said local oscillator includes the combination of a discriminator and a phase detector, said discriminator being responsive to the frequency of the output of said rear amplifier, and said phase detector being responsive to the relative phase between the output of said rear amplifier and the output of said Doppler frequency generating means.

8. In a guided missile of the semi-active homing type, a target Doppler receiving system, comprising, a rear antenna for receiving radiation directly from a remotely situated radio transmitter, a variable frequency local oscillator, a rear mixer for combining the output of said local oscillator with the signal received by said rear antenna, a front antenna for receiving signals transmitted by said transmitter and reflected by a target, the frequency of the signal at said front antenna differing from the frequency at said rear antenna due to the Doppler effect introduced by relative missile and target motion, a front mixer for combining the output of said local oscillator with the signal received by said front antenna thereby producing a signal having a frequency equal to the difference in frequency between said local oscillator signal and the signal received by said front antenna, an amplifier receiving the output of said front mixer, said amplifier having a fixed center frequency and a band width substantially narrower than the Doppler difference in frequency between the signal at said front antenna and at said rear antenna, and means for varying the frequency of said local oscillator to such a value as to produce an output from said amplifier.

9. Apparatus as claimed in claim 8 with additionally means sensitive to the frequency of the output of said amplifier for controlling said means for varying the frequency of said local oscillator thereby enabling frequency tracking of the signal reflected by a target.

10. In a guided missile of the semi-active homing type, a receiver for selecting and tracking a particular target signal characterized by a Doppler shift in frequency resulting from relative motion between the missile and the target, comprising, a rear receiver including a rear antenna, a rear mixer, and a rear amplifier, a front receiver including a front antenna, a front mixer and a front amplifier, the bandwidth of said front amplifier being substantially narrower than the spectrum of target Doppler frequencies, a variable frequency local oscillator supplying its output to the mixers of both said rear receiver and said front receiver, Doppler signal generating means aboard the missile for generating a signal having a frequency component equal to the target Doppler frequency, means comparing the output of said rear receiver with the output of said Doppler signal generating means for controlling the frequency of said local oscillator, and means responsive to the frequency of the output of said front receiver for controlling the frequency of said Doppler signal generating means.

11. Apparatus as claimed in claim 10 with additionally, means for selecting from a remote location a predetermined frequency output from said Doppler signal generating means.

12. Apparatus as claimed in claim 10 with additionally, means for sweeping said Doppler signal generating means through a predetermined frequency spectrum and means responsive to an output from said front receiver for disabling said sweeping means.

13. In a Doppler receiver for a semi-active homing system for guiding a missile toward a moving target identified by a Doppler frequency resulting from relative motion between the missile and the target, said receiver including a local oscillator; apparatus for controlling the frequency of said local oscillator, comprising the combination of a discriminator with a phase detector, the sum of the outputs of said discriminator and said phase detector providing a frequency control voltage for said local oscillator, input to said discriminator being supplied from a beat signal between the output of said local oscillator and a signal received by the missile, one input to said phase detector being supplied by signal generating means providing a frequency component equal to the desired target Doppler frequency, and another input to said phase detector being supplied from the beat signal applied to said discriminator.

14. In a semi-active homing system for guiding a missile toward a moving target identified by a Doppler frequency generated by relative motion between the missile and the target, a target Doppler receiving system, comprising, a rear receiver including a rear antenna, a rear mixer, and a rear amplifier, a front receiver including a front antenna, a front mixer and a front amplifier, a variable frequency local oscillator supplying its output to the mixers of both said rear receiver and said front receiver, first sweep means for periodically varying the frequency of said local oscillator through a predetermined frequency range, Doppler signal generating means aboard the missile for generating a signal having a frequency component equal to the Doppler frequency characterizing a moving target, second sweep means for periodically varying the frequency of the output of said Doppler signal generating means, means comparing the output of said rear receiver with the output of said Doppler signal generating means to provide control of the frequency of said local oscillator, and means responsive to the frequency of the output of said front receiver to provide control of the frequency of said Doppler signal generating means.

15. Apparatus as claimed in claim 14 wherein and Doppler signal generating means comprises a voltage controlled oscillator.

16. Apparatus as claimed in claim 14 wherein said means providing control of the frequency of said local oscillator includes a phase sensitive detector.

17. In a semi-active homing system for guiding a missile toward a moving target identified by Doppler signals generated by relative motion between the missile and the target, a local oscillator, means including a front antenna and a front mixer receiving output from said local oscillator for generating a front signal, means including a rear antenna and a rear mixer receiving output from said local oscillator for generating a rear signal, means for generating a variable frequency signal, means receiving said rear signal and said variable frequency signal and providing control of the frequency the output of said local oscillator in such a manner as to render the frequency of said rear signal equal to the frequency of said variable frequency signal, and means responsive to the frequency of said front signal for controlling the frequency of said variable frequency signal.

18. Apparatus as claimed in claim 17 wherein said last named means includes a discriminator.

19. Apparatus as claimed in claim 17 wherein said means providing control of the frequency of said local oscillator includes a phase detector arranged to compare the phase of said rear signal with the phase of said variable frequency signal.

20. Apparatus as claimed in claim 17 wherein said means providing control of the frequency of said local oscillator includes the combination of a discriminator receiving said rear signal with a phase detector arranged to compare the phase of said rear signal with the phase of said variable frequency signal, the combined outputs of said second discriminator and said phase detector providing control of said local oscillator.

References Cited
UNITED STATES PATENTS

| | | | |
|---|---|---|---|
| 2,621,243 | 12/1952 | Sunstein | 343—7.7 |
| 2,710,398 | 6/1955 | Emslie | 343—7.7 |
| 2,859,433 | 11/1958 | Saxton | 343—8 |

BENJAMIN A. BORCHELT, *Primary Examiner.*

NORMAN H. EVANS, CHESTER L. JUSTUS,
*Examiners*

D. G. REDINBAUGH, T. H. WEBB,
*Assistant Examiners.*